(12) United States Patent
Tzamaloukas

(10) Patent No.: US 9,185,678 B2
(45) Date of Patent: *Nov. 10, 2015

(54) SYSTEM AND METHOD FOR MATCHING CAPABILITIES OF ACCESS POINTS WITH THOSE REQUIRED BY AN APPLICATION

(71) Applicant: DASH NAVIGATION, INC., Sunnyvale, CA (US)

(72) Inventor: Assimakis Tzamaloukas, San Jose, CA (US)

(73) Assignee: BlackBerry Corporation, Wilmington, DE (US)

( * ) Notice: Subject to any disclaimer, the term of this patent is extended or adjusted under 35 U.S.C. 154(b) by 405 days.

This patent is subject to a terminal disclaimer.

(21) Appl. No.: 13/706,889

(22) Filed: Dec. 6, 2012

(65) Prior Publication Data
US 2013/0095880 A1    Apr. 18, 2013

Related U.S. Application Data

(63) Continuation of application No. 11/903,442, filed on Sep. 21, 2007, now Pat. No. 8,339,990.

(60) Provisional application No. 60/846,521, filed on Sep. 23, 2006.

(51) Int. Cl.
| | | |
|---|---|---|
| H04B 7/00 | (2006.01) |
| H04W 64/00 | (2009.01) |
| H04W 48/20 | (2009.01) |
| H04W 48/18 | (2009.01) |
| H04L 29/08 | (2006.01) |
| H04W 4/02 | (2009.01) |
| H04W 84/12 | (2009.01) |
| H04W 8/00 | (2009.01) |
| H04W 28/26 | (2009.01) |

(52) U.S. Cl.
CPC ............. *H04W 64/006* (2013.01); *H04L 67/16* (2013.01); *H04L 67/327* (2013.01); *H04W 48/18* (2013.01); *H04W 48/20* (2013.01); *H04W 4/02* (2013.01); *H04W 8/005* (2013.01); *H04W 28/26* (2013.01); *H04W 84/12* (2013.01)

(58) Field of Classification Search
CPC ................... H04W 36/0005; H04W 36/0055; H04W 36/06; H04W 36/08
USPC ................................ 370/310, 328, 331, 332
See application file for complete search history.

(56) References Cited

U.S. PATENT DOCUMENTS

| 5,835,061 | A  * | 11/1998 | Stewart ......................... 342/457 |
|---|---|---|---|
| 7,466,986 | B2 * | 12/2008 | Halcrow et al. ............. 455/456.2 |
| 7,532,898 | B2 * | 5/2009 | Halcrow et al. ............. 455/456.2 |
| 7,542,449 | B2 * | 6/2009 | Kim et al. ...................... 370/331 |
| 8,374,623 | B2 * | 2/2013 | Vellanki et al. ............. 455/456.1 |
| 2002/0198694 | A1 | 12/2002 | Yang et al. |
| 2003/0158922 | A1 | 8/2003 | Park |
| 2004/0230370 | A1 | 11/2004 | Tzamaloukas |

(Continued)

*Primary Examiner* — Dmitry H Levitan
(74) *Attorney, Agent, or Firm* — Jon Gibbons; Fleit Gibbons Gutman Bongini & Bianco P.L.

(57) ABSTRACT

A system and method uses a communication request and/or historical data collected by one or more devices to identify whether to fulfill the request using ad hoc networking or access points. If an access point is determined to be used, the system and method attempts to identify those access points that can best fulfill the request and then attempts to use such access points to fulfill the request.

22 Claims, 8 Drawing Sheets

(56) References Cited

U.S. PATENT DOCUMENTS

| | | | |
|---|---|---|---|
| 2004/0247278 A1* | 12/2004 | Hirano et al. | 385/147 |
| 2005/0002347 A1 | 1/2005 | Lee et al. | |
| 2005/0125148 A1* | 6/2005 | Van Buer et al. | 701/209 |
| 2006/0286977 A1 | 12/2006 | Khandelwal et al. | |
| 2007/0052552 A1* | 3/2007 | Suzuki | 340/905 |
| 2007/0162550 A1* | 7/2007 | Rosenberg | 709/206 |
| 2007/0184831 A1* | 8/2007 | Morimoto | 455/432.1 |

* cited by examiner

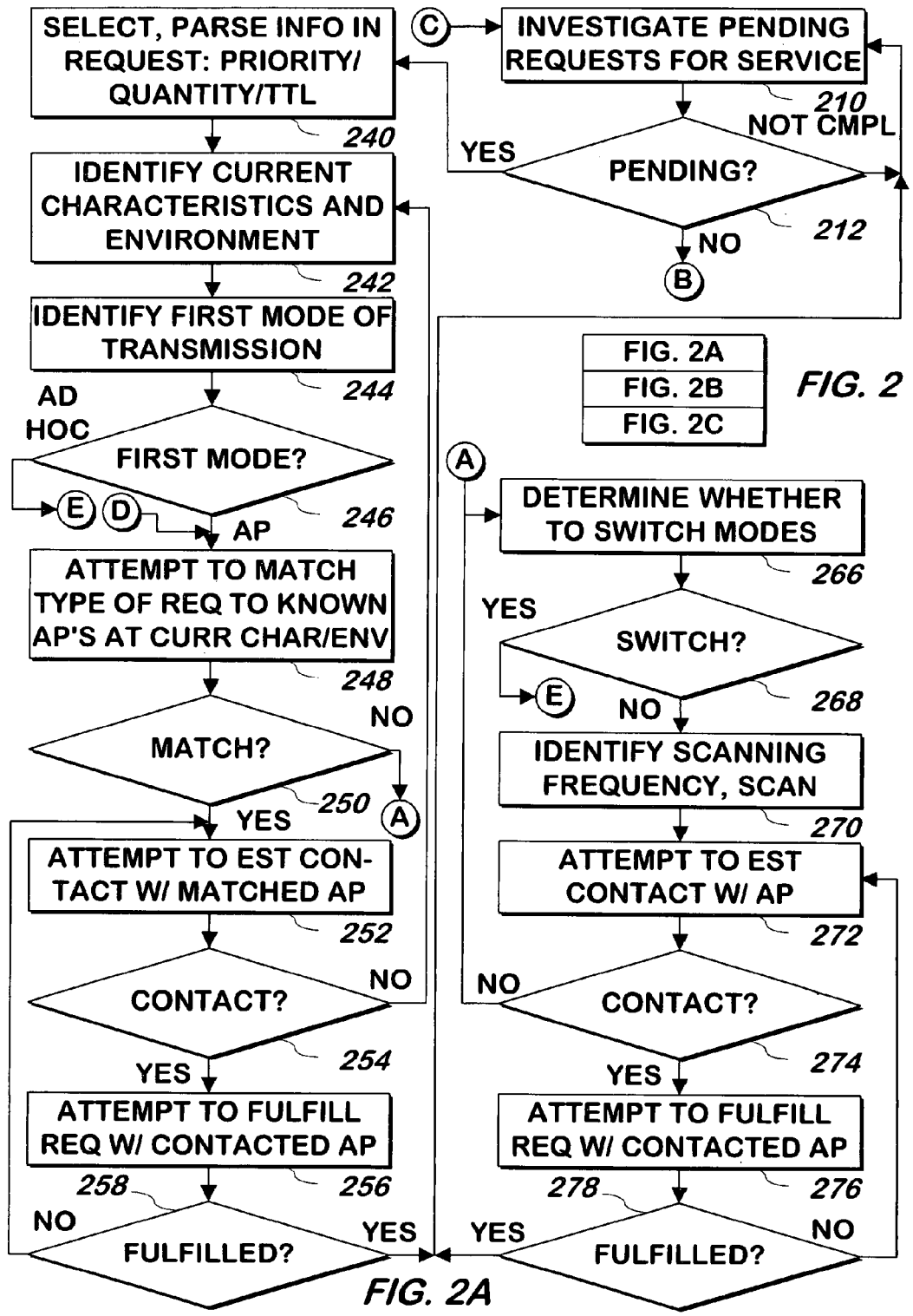

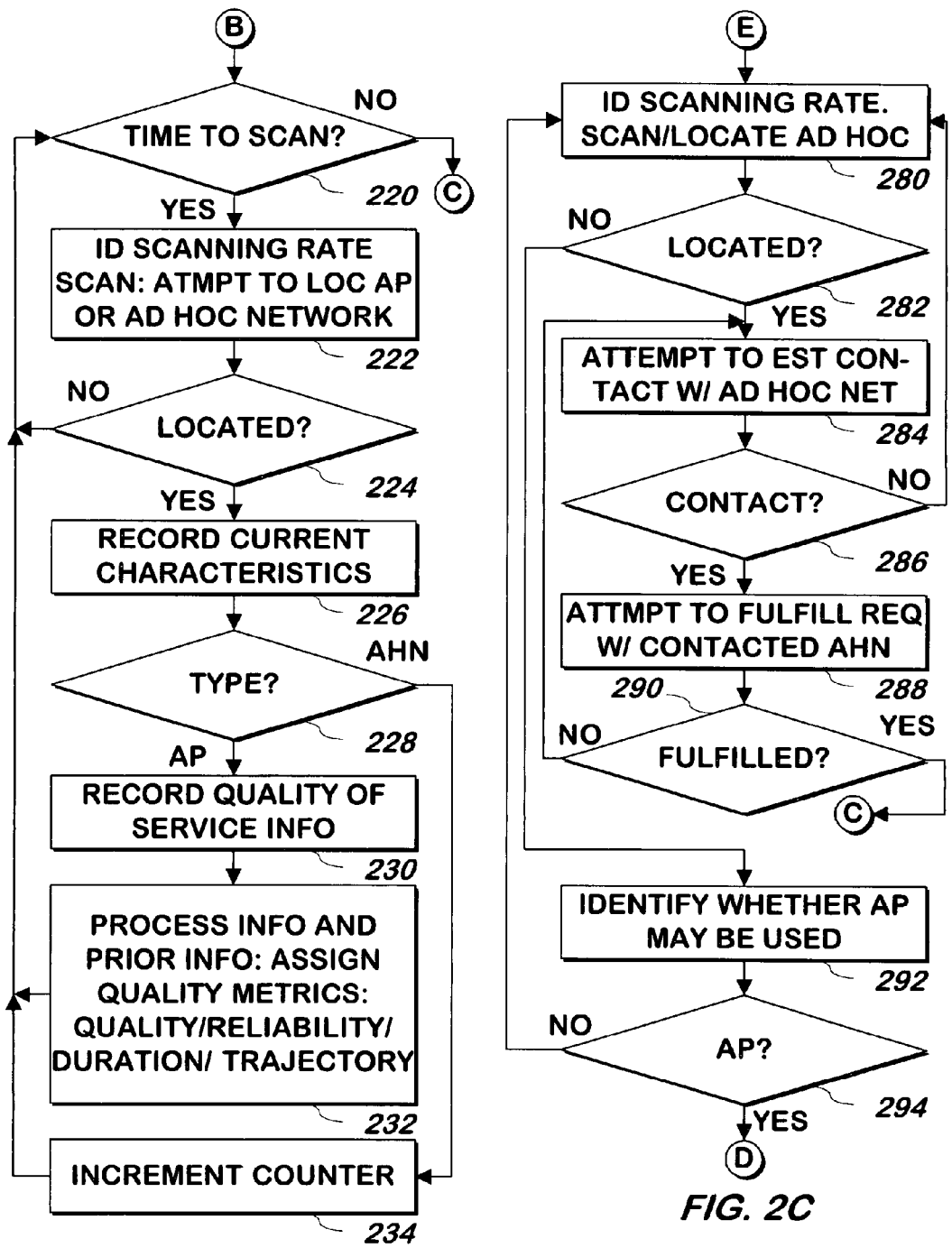

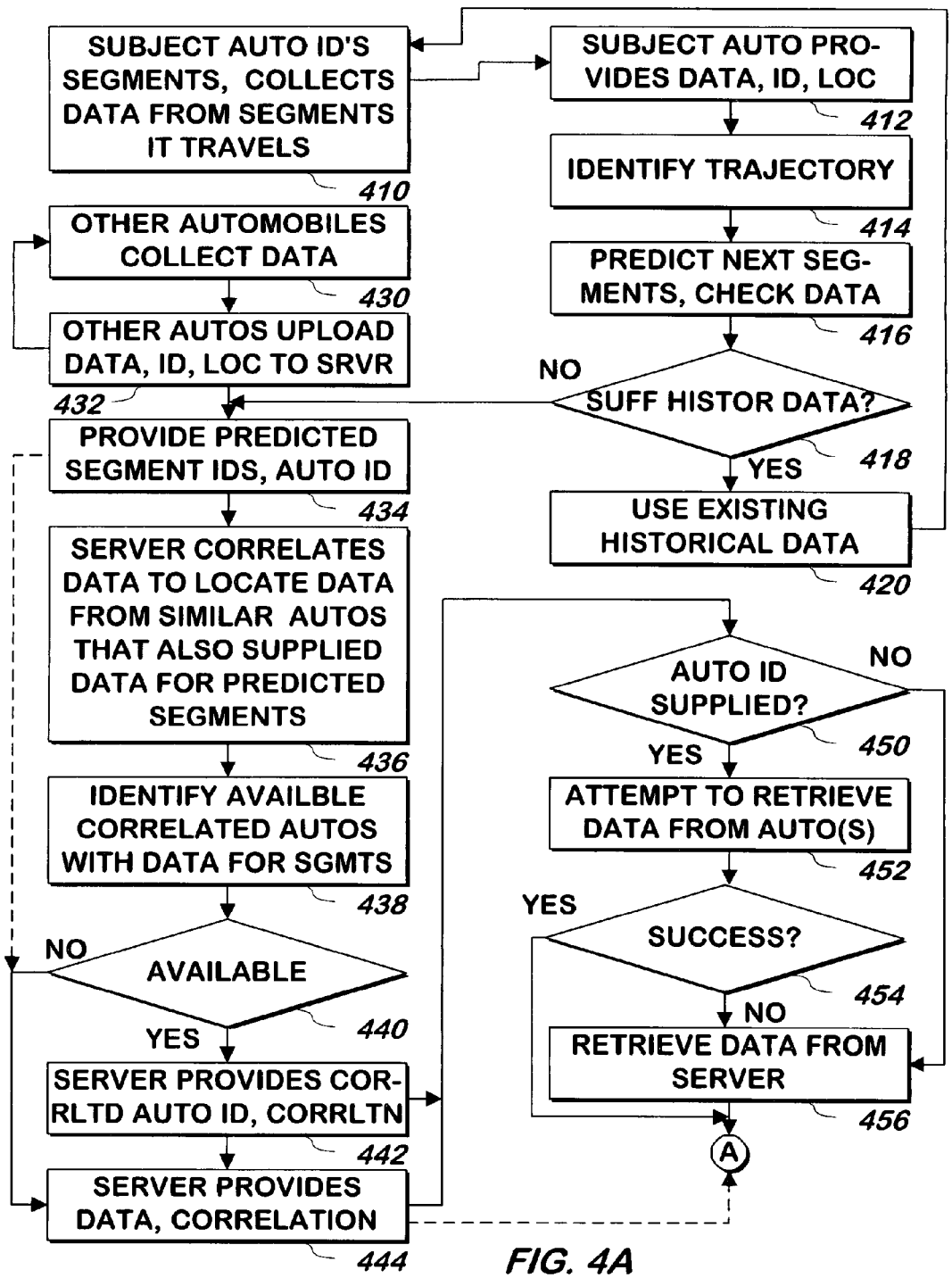

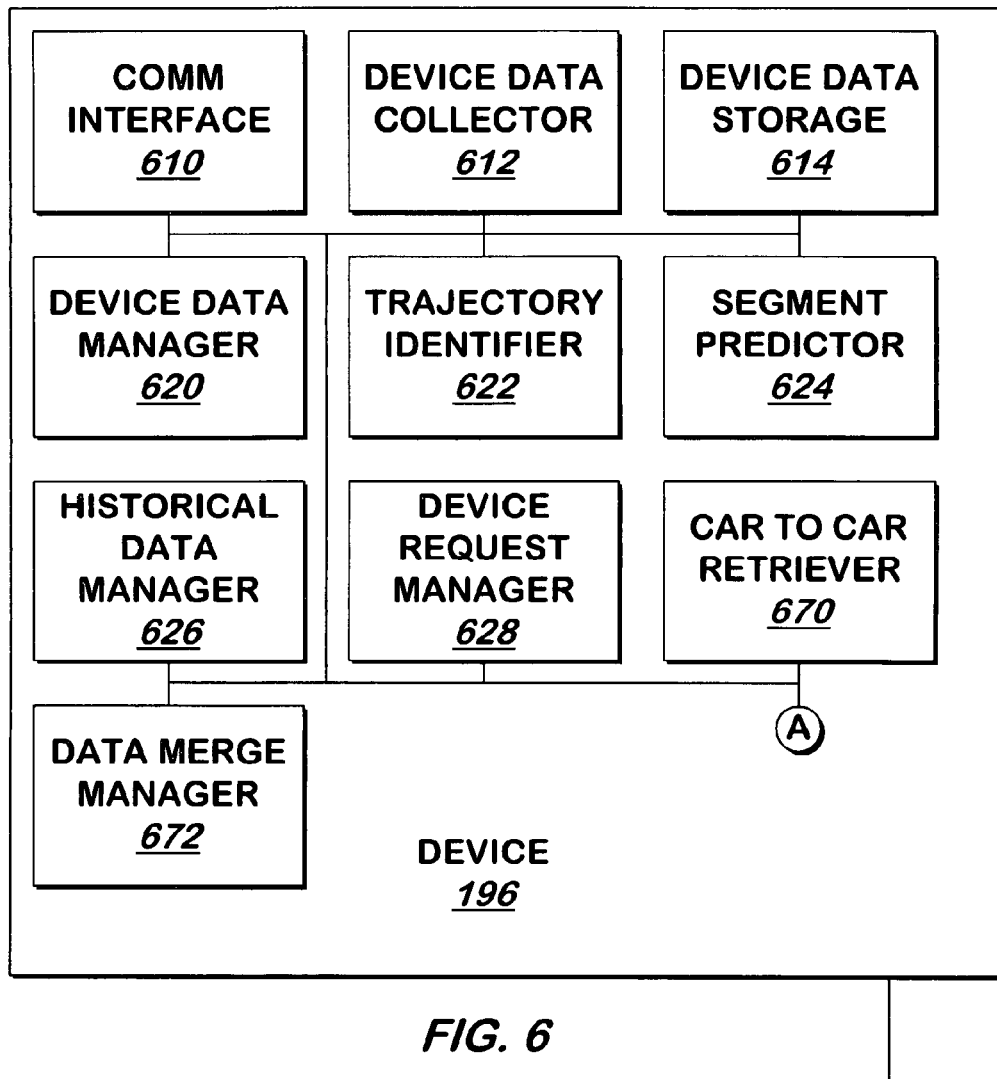
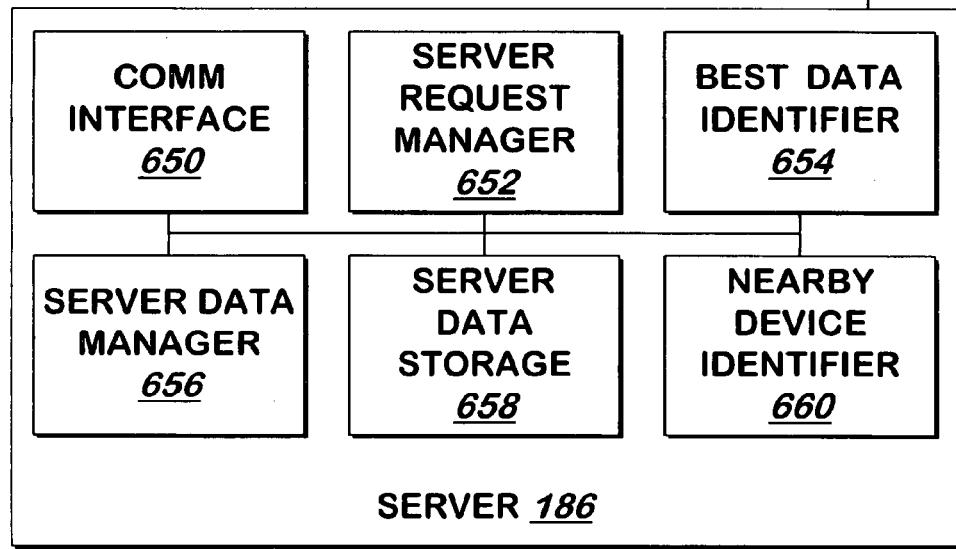
FIG. 6

SYSTEM AND METHOD FOR MATCHING CAPABILITIES OF ACCESS POINTS WITH THOSE REQUIRED BY AN APPLICATION

RELATED APPLICATION

This application is a continuation of U.S. patent application Ser. No. 11/903,442, filed Dec. 19, 2007, which claims the benefit of U.S. Provisional Application No. 60/846,521, filed Sep. 23, 2006, each of said applications are expressly incorporated by reference herein in their entirety.

FIELD OF THE INVENTION

The present invention is related to computer software and more specifically to communications computer software.

BACKGROUND OF THE INVENTION

Many computer systems communicate using wireless network communications defined by the 802.11 family of specifications. Wireless communication under 802.11 may be made via either of two types of networking. One type of networking uses a conventional access point that operates as a base station to receive communications from one or more devices and forward the communications to another device, or to a network such as the Internet, local area network or both. Another type of networking is referred to as ad hoc networking, in which two wireless devices communicate with one another without the need for a separate access point. In this form of networking, each communicating computer handles the networking functions to allow the two computers to communicate.

To use wireless networking, the user of a computer system specifies an access point or a computer system to use for wireless communications and begins communicating with that access point or computer system. If an access point is specified that has access to a network such as the Internet, communication may be made via the network. In both cases, communications may continue for as long as desired, provided both devices remain in range to one another and the quality of the wireless communications is sufficient.

If the user does not know of an access point, the user may request that the user's computer system scan for an access point. The computer system may then scan for all access points across the various frequencies that access points use, listening for a beacon that some access points will periodically broadcast to advertise their presence. The beacon may include the name of the access point to use as a reference.

When the computer system is in an automobile, access point discovery and use is much more complex. There may be thousands of access points available along a route being traveled, though the user may not know of any of them. In some cases, by the time the user could scan for an access point, receive the names, select one and begin communicating using it, the automobile may have traveled out of range of the access point.

If the user of the network is an application program, the process can be automated to occur more rapidly so that there is at least a chance that an access point can be located and used before the access point is out of range. However, there are still problems with such an arrangement. The access point scanning and discovery process still takes time, and so by the time an access point is found, much of the time the access point is available can be consumed in the discovery process. Once an access point is discovered, it may not be appropriate for use by the application, for example, because the available bandwidth on the back end of the access point is too low, or the quality of the signal is too erratic to be useful, in spite of the fact that a different application, or the same application under different circumstances, may have been able to use that same access point. There may be multiple access points available at a given location, and determining which one is appropriate for the application by testing each of them just before use would again consume too much of the time the access point is available for use and may not identify issues such as reliability problems.

If the requirements of the application can be met using an ad-hoc network or an access point, it may be possible to try to scan for an ad hoc network to fulfill the request. However, if the automobile is on a residential road in a suburban environment, it may be unlikely that such a network can be located rapidly. In such an environment, if the application requires communication with either an access point or an ad hoc network, it would be desirable to start searching for an access point before searching for an ad hoc network connection.

What is needed is a system and method that can help avoid the discovery process when the need arises to communicate with an access point from a vehicle, thereby leaving more of the time for which a useful access point is available for the purpose desired by the application requesting it; can select the proper access point for the needs of an application; and can determine whether it can be more productive to start searching for an ad hoc network or access point.

SUMMARY OF INVENTION

A system and method identifies a scanning rate and then scans for access points using that rate when no requests are pending as an automobile or other vehicle drives around. The scanning rate may be determined by how many times a segment of a road has been scanned before, or how many times the segment of the road has been scanned before at a similar time and/or similar type of day. In another embodiment, the scanning rate may be a determined using environmental characteristics, such as whether the area is hilly or the road is curvy, or other characteristics, such as whether the vehicle is traveling at a high rate of speed. Both of these things may be used in another embodiment.

There may be any number of types of days: weekdays that are not holidays, Saturdays, Sundays, holidays that fall on a weekday, and holidays that fall on a weekend, although other embodiments may use different types of days, such as may be made by appending an additional descriptor (e.g. summer and non-summer) to the above types to cause the number of types to expand by a multiple of the number of types listed above. Time segments may consist of 30 minute segments.

The system and method then stores statistics regarding the access points it discovers as well as characteristics such as the time of day, date and location of the automobile. Such information may be shared among different vehicles if desired.

When a request for a network connection is received, the request contains information about how much data corresponds to the request, how rapidly the information needs to be communicated, and optionally, whether an ad hoc connection, access point, or either, can be used.

If the request permits either to be used, the system and method can use the information it or another vehicle has previously identified to determine whether to first attempt to locate an access point or to first attempt to locate an ad hoc connection. Once the determination of what type of communication (access point or ad hoc) will be used, an attempt is made to locate a wireless device using that first mode of communication.

To locate an access point, the system and method identifies current characteristics such as the location, type of day and time of day, and matches the characteristics and the information regarding the request to the access points about which it has information, and attempts to select an access point that best matches the request or one that is known to provide a high quality of service. If no such known access point is located, the system and method may scan for access points or may attempt to locate a device that can communicate using ad hoc networking, depending on whether the request indicates that it may be fulfilled with either an ad-hoc connection or an access point connection.

BRIEF DESCRIPTION OF THE DRAWINGS

FIG. 2, consisting of FIGS. 2A, 2B, and 2C, is a flowchart illustrating a method of fulfilling requests for wireless service and identifying access points according to one embodiment of the present invention.

FIG. 6 is block schematic diagram of a system for obtaining historical data according to one embodiment of the present invention.

DETAILED DESCRIPTION OF A PREFERRED EMBODIMENT

Figure 1A:
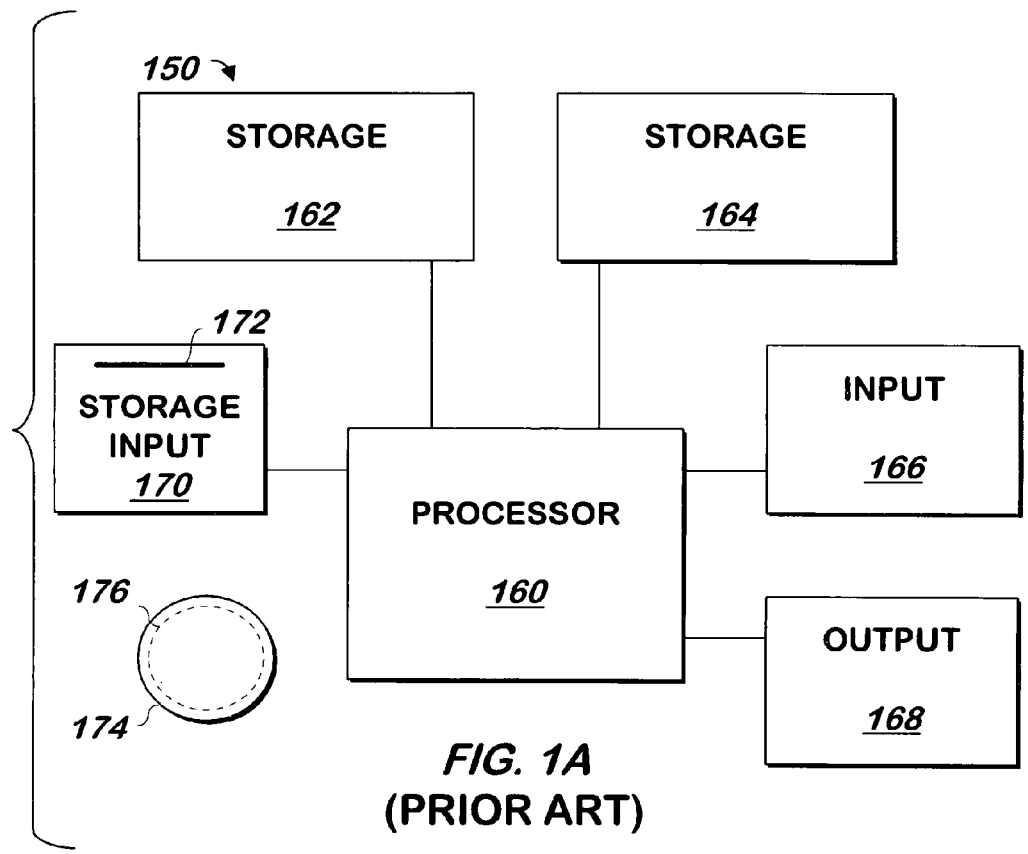
FIG. 1A is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, a conventional processor, operating system or both are used, where the processor and operating system is suitable for a system embedded in a conventional device. In one embodiment, each computer system 150 is part of an embedded system and includes an ARM processor and related components commercially available from ARM, such as the conventional XScale family of components available from Marvell Technology Group, or any other embedded system components running in a device.

In one embodiment, each computer system 150 is a conventional SUN MICROSYSTEMS ULTRA 10 workstation running the SOLARIS operating system commercially available from SUN MICROSYSTEMS, INC. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT CORPORATION of Redmond Wash. or a MACINTOSH computer system running the MacOS or OpenStep operating system commercially available from Apple Computer Corporation of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 1B:
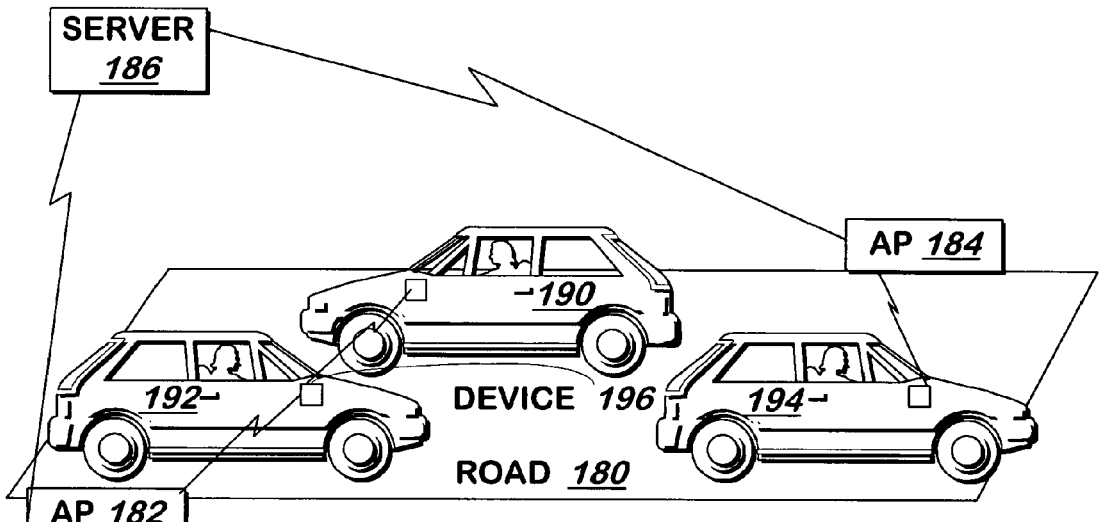
FIG. 1B is a block diagram of automobiles on a road driving by roadside wireless access points.
Figure 3:
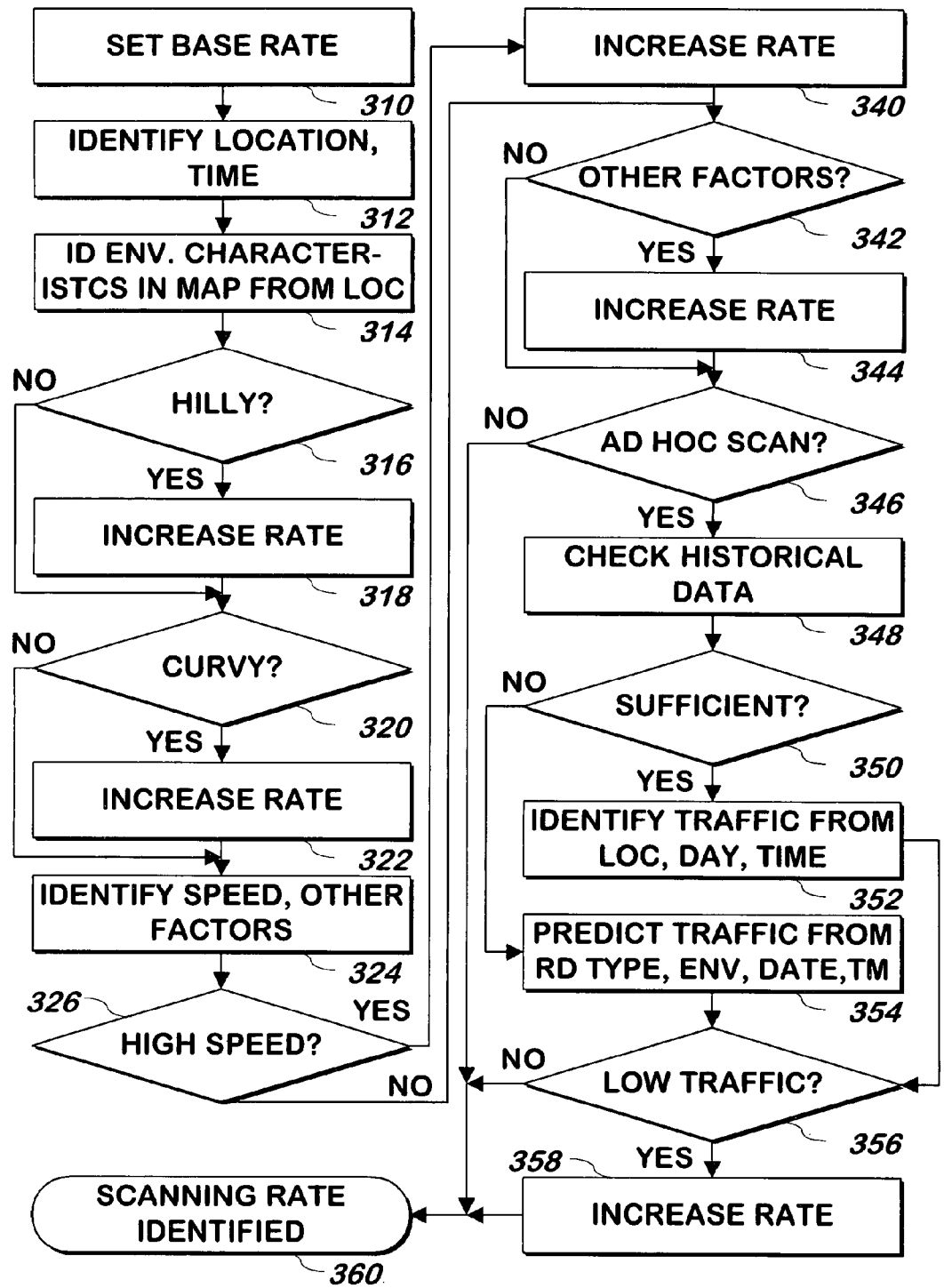
FIG. 3 is a flowchart illustrating a method of identifying a scanning rate according to one embodiment of the present invention.

In one embodiment, the present invention may be used in the environment illustrated in FIG. 1B, though it may also be used in other environments. Referring now to FIG. 1B, a conventional road, having nearby wireless access points, and being driven on by conventional automobiles, is shown according to one embodiment of the present invention. Automobiles 190, 192, 194 drive on road 180, which has thereupon or nearby, roadside wireless access points 182, 184, which in turn include conventional wireless access points running any of the conventional 802.11 family protocols, though other wireless protocols may be used. Some or all of automobiles 190, 192, 194 have a device such as device 196 containing a conventional wireless radio (not shown) for communicating with access points 182, 184 and the radios of other automobiles 190, 192, 194, which may contain devices similar or identical to device 196. Device 196 may include a conventional GPS receiver for use as described herein.

Although the present invention is described with respect to automobiles, the present invention may be used in any vehicle, such as a boat, plane, bicycle or other moving object, and each such object may contain a device similar or identical to device 196. In one embodiment, some other similar devices may be contained in stationary devices.

Wireless access points 182, 184 are coupled to a conventional network such as the Internet, Ethernet or both, and the network is coupled to server 186, which may include one or more conventional servers. Three automobiles 190, 192, 194 and two wireless access points 182, 184 and one server 186 are shown in one embodiment of the present invention, though other numbers of these items may be used.

Device 196 may communicate with access points 182, 184 via conventional wireless networking techniques, or with devices in other automobiles 190, 192, 194 via an ad-hoc mode of network communication. Such communication techniques are performed in a conventional manner, using conventional protocols.

The present invention processes requests for network access. In one embodiment, each request specifies whether it should be directed only to an access point, only to an ad-hoc network communication, or whether either type of communication can be used. Such requests may be timestamped as they are received, for example, by retrieving the date and time from a system clock and storing the date and time with the request. In one embodiment, each request for network access is received from a conventional application program.

Referring now to FIG. 2, consisting of FIGS. 2A, 2B and 2C, a method of fulfilling requests for wireless service and identifying access points is shown according to one embodiment of the present invention. Pending requests for service are investigated 210. If any requests are pending 212 and optionally, there are no requests in progress, the method continues at step 214. Otherwise 212, the method continues at step 220 of FIG. 2B. In one embodiment, if requests are in progress but are not completed, the method continues at step 210. In this embodiment, only one wireless communication is permitted at any time. In another embodiment, multiple wireless communications are permitted.

For purposes of example, it shall be assumed that, initially, there are no pending requests for service and that therefore, step 220 of FIG. 2B follows step 212.

No Pending Requests for Service: Scanning and Processing

In one embodiment, when there are no pending requests for service, a scanning frequency is identified and scanning is commenced to identify any access points at the location that can be used and to identify certain quality of service measurements that may be taken regarding such access points, and to identify the number of ad hoc networks detected. As will be described in more detail below, the identity and location of, and the quality of service provided by, access points, along with other information about access points, can be used to rapidly locate an access point that most closely matches, or can satisfy, a request for service when such a request for service that can use an access point is received at or near the same location. The number of ad hoc networks can be used to determine the likelihood of being able to use an ad hoc network at the same location and the same time and same type of day (e.g. weekday, Saturday or Sunday) when a request for service is received that can use an ad hoc network at or near the same place and time.

Determining the Scanning Rate.

At step 220 of FIG. 2B, if it is appropriate to scan at the current time, a scanning rate is identified and an attempt is made to locate an access point or ad hoc network by scanning for an access point or ad hoc network 222. In one embodiment, it is always appropriate to scan and so step 220 is not used, and the "no" branch of step 212 is followed by step 222. In another embodiment, scanning is commenced every second and can occur for a half second in every one second; therefore, in this embodiment, sometimes it is not time to scan. If it is not time to scan 220, the method continues at step 210 of FIG. 2A.

Identify the Scanning Rate.

At step 222, a scanning rate is identified. There are many ways of identifying a scanning rate, one of which will be described. In one embodiment, the scanning rate is identified based on the number of times a road segment has been scanned before or has been scanned before in the same time segment and type of day as the current time and date, or the number of times the road segment has been scanned before in the same time segment and type of day as the current date and time when traveling in the same trajectory. In other embodiments, the scanning rate is identified using information about the road segment being scanned retrieved from a conventional map database, scanning more frequently based on topology such as whether the road segment being traveled is hilly or curvy, and the speed limit or known speed being traveled. Other embodiments may use a combination of these factors.

The current date and time is retrieved, for example, from a system clock, and the current location is identified, for example by using radio signals from a global positioning system 310. The current location is stored 312 for use as described below. The current segment is identified 314 using a conventional map database that allows the retrieval of a segment identifier corresponding to a latitude and longitude of the current location. A segment is a portion of a road in one embodiment, though a segment may correspond to an area in another embodiment. The map database may use a conventional segment technique to divide each road into a number of segments, however, the present invention is not limited by the segment resolution of the map database. In one embodiment, each segment in the map database may be divided into a number of smaller segments and such segments identified using the segment identifier provided by the map database, and a sub-segment identifier that can be added based on the location within the segment, identified by retrieving the end coordinates of the segment and the current location.

In one embodiment, as part of step 314, the trajectory is identified using the location stored in step 312 and a prior location stored, such as in a previous iteration of step 312. The number of recent scans made in the same segment or same segment and trajectory is identified 316. A recent scan may be those falling within a threshold amount of time from the current date and time. The number of recent scans may be scans made by the same device, scans made by the same device and other devices, or scans made by the same device and other correlated devices as described in more detail below. In one embodiment, the number of scans is identified only from those scans made in the same time segment and for the same type of day. In one embodiment, a time segment is a half hour period starting and ending on the half hour. In one embodiment types of days include non-holiday weekdays, holiday weekdays, Saturdays, and Sundays, though other types of days may be used. In one embodiment, the type of day may further be divided into those falling within a "high season" and those not falling within the high season. A high season may be summer months for a coastal community, or winter months for a community that has a close proximity to ski area, or harsh winter conditions.

If the number of such recent scans exceeds a threshold 320, the scanning rate is identified as a low level 322, for example, every quarter second. If the number of such recent scans does not exceed the threshold 320, the scanning rate is identified as a high level 324, such as every tenth of a second.

In one embodiment, step 322 also includes checking to see that scans were performed on a sufficient number of different days, so that a device that may be stationary for a period of several hours doesn't repeatedly scan the same segment from the same position and cause the threshold to be exceeded. Other forms of ensuring that the segment has been scanned, over its length, on many occasions, or both, may be used.

Scanning for Data

Referring again to FIG. 2B, as part of step 222, once the scanning rate is identified, a scan of the wireless frequencies used for 802.11x communication commences at that scanning rate using conventional techniques. Those techniques include listening for beacons from wireless access points, or detecting the availability of, or actual in progress, ad hoc communications between two devices other than the one in which the detection is performed, or performing any of these. For example, in FIG. 1, devices in automobiles 192 and 190 may be having an ad-hoc communication, and the device in automobile 194 can detect it. The scanning may occur for a scanning period, such as a half a second or another period of time.

In one embodiment, both types (ad hoc and access point) of communications are scanned for at the same time. In other embodiments, ad hoc networks are scanned separately from access point scans, for example by performing one or more scans of one type, and then one or more scans of another type.

If a wireless access point or ad hoc network is detected 224, the current characteristics are recorded, along with the date and time, which may be received from a system clock approximately when the recordation takes place 226. Current characteristics may include the location, which may be converted to a segment identifier and either or both of these are recorded. Trajectory information, which may be obtained by recording two successive locations, may also be recorded as part of step 226.

In one embodiment a conventional map database is used to identify a road segment identifier from the location as part of step 226. The log of the date and time and the segment identifier may be used to allow a count of the number of times a segment has been scanned. In one embodiment, the log is arranged as a circular buffer, with older data being overwritten with newer data. In one embodiment counters may be used instead of, or in addition to, the log to track the number of times a segment was scanned.

If the type of network located in step 222 is an access point 228, the method continues at step 230, and if the type of network located in step 222 is an ad hoc network 228, the method continues at step 234.

At step 230, quality of service information is recorded. In one embodiment, such quality of service information includes RSSI, packet loss, and duration of contact of the access point. Other quality of service information provided by conventional wireless radios may be recorded that can assist in determining the bandwidth of the access point. This may be performed by providing a request for data and receiving the data, and recording the information as the data is received. In one embodiment, the segment is divided into segments smaller than those used by a conventional map database, and the bandwidth is recorded on the smaller-segment basis along with the segment identifier of the smaller segment so that the bandwidth at different locations among the segment can be determined.

The information may be processed along with prior information regarding that access point and a quality level may be assigned to each access point identified via the scan 232.

In one embodiment, to process the information for each access point detected, the quality of service information is first converted to an approximate bandwidth that is capable for the detected values of the quality of service information. To convert the quality of service information into bandwidth, a conventional table is used that maps various combinations of quality of service information to bandwidth. The table is derived using convention techniques or published tables. The combination of quality of service information in the table nearest the quality of service detected is identified, for example by identifying the sum of the square of the difference between the quality of service measurements identified and the corresponding values in each row in the table, and using the bandwidth corresponding to the row with the smallest sum. The bandwidth is stored, or in place of, the remaining quality of service measurements.

At various times, such as when a segment has been exited or when the scanning period is complete, the raw quality of service measurements are processed. In one embodiment, the processing includes integrating the bandwidth for each access point, on a segment by segment basis to produce a quantity of data that can be communicated using that access point in the segment. In one embodiment, for this purpose, each segment for which a data amount is computed is a map segment, not the smaller segments into which such segments may have been divided. To integrate the bandwidth, the bandwidth identified as described above is multiplied by the amount of time between each scan and the results are summed across the map segment. The integrated data amount is identified for each such access point and each segment since the data was last processed. The amount of data is then stored associated with the segment identifier and a date and time, such as the first, last or middle date and time corresponding to each measurement. In one embodiment, the comparison of the number of times the segment was scanned uses this stored date and time. In one embodiment, the integrated data rate is considered to be "raw data" as described herein.

In one embodiment, the raw data may be further processed with previous raw data for the same segment, access point, and optionally trajectory, in order to identify how consistent the integrated amount of data is from one time to the next. In one embodiment, before performing such analysis, for each segment scanned, the access points identified in prior scans of the same segment and in the same trajectory are identified, and a "not found" counter for any access points previously identified in the segment but not identified in the most recent scan is incremented, and a "found" counter for the remaining access points is incremented. Any new access point not previously identified has its found counter incremented. In one embodiment, multiple sets of such counters may be used, with different counter for different types of days, different time segments or both of these. In one embodiment, there are not found and found counters for each trajectory in the segment.

Access points in a segment having a found counter for the trajectory that exceeds, by a threshold amount, the not found counter for the access point in the segment for the trajectory, are marked as reliable or marked as reliable in the trajectory if the found counter for the access point, trajectory, and segment itself exceeds a minimum threshold, and other access points no marked as reliable may be marked as not reliable.

A quality level may be assigned to the access point, segment and trajectory, which may be based on the bandwidth, reliable mark, or both. For example, a quality level of high, or low, or high medium or low, may be assigned based on the average amount of data for that segment and access point for the most recent N data amounts identified. The average may be weighted with more recent measurements having a higher weight. Quality levels may be assigned based not just based on the access point, segment and trajectory, but also on the type of day, time segments or both, with the averages limited to that time segment and/or type of day. In one embodiment, however, access points not marked as reliable have a low, or extra low quality level assigned to the access point, segment and trajectory. In another embodiment, the quality level is not affected based on the reliability of the measurement, but considerations of quality levels described herein not only take into account the quality level, but also whether the access point is marked as reliable so as to prefer access points that are reliable unless no reliable access point that can carry the data is available.

In one embodiment, the quality level also takes into account the consistency of the amount of data experienced for the same access point in the same segment and trajectory, with the N smallest amounts of data in the most recent M identifications of the data level (optionally for the same type of day, time segment or both) being weighted higher than the others, with N and M being integers greater than zero.

In one embodiment, the access points are assigned to different lists of access points having a similar quality level. The above items are performed as part of step 232. It is noted that the quality level will be assigned as a function of the duration of contact with the access point, which will cause the integrated amount of data to be higher than for access points for which the duration of contact is more limited.

At step 234, taken if the type of communication identified during the scan is an ad hoc communication, for each segment traversed during the scan, the average number of ad hoc connections identified during the scan is stored, with the date and time of the scan, identified in the manner described above, and the trajectory. In one embodiment, for each map segment scanned, an overall average number of ad hoc connections is assigned to the segment, trajectory, and optionally type of day, using the most recent N scans, or those from the most recent N days, for the same map segment, trajectory and optionally, type of day. The average may be weighted, with the most recent numbers receiving more weight, or may grant more weight to the lowest or highest number of ad hoc connections of the H considered. Each of these computations may be performed as part of step 234.

It is noted that both ad hoc communications and access points may be located during the scan. In such case, both branches of step 228 are taken.

In one embodiment, following steps 232 and 234 the method continues at step 220. In another embodiment, the method continues at step 210 as shown by the dashed line in the Figure Selecting the Next Request to Process and Identifying the First Mode of Transmission to Attempt.

The above description referenced the circumstance in which no pending requests for service were located, though in one embodiment, scans may take place even if pending requests for service exist. Referring again to FIG. 2A, if such a pending request for service is located 212, the method continues at step 240. At step 240, the information contained in the request is parsed. In one embodiment, request contains information regarding the priority of the request, the amount of data in the request, and a "time to live" parameter that indicates the maximum amount of time that should elapse before the data is completely transmitted, and such information is parsed and stored. In one embodiment, the request indicates whether the request should be fulfilled by either an access point, or an ad hoc network, or whether either mode of communication would be acceptable.

Step 240 also includes selecting a pending request. In one embodiment, the request selected is the oldest pending request, and in another embodiment, the request selected is the request with the highest priority, ties being broken by expiration of the time to live parameter in the request, with the earliest time to live expiration (the time the request was received plus the time to live if the time to live is specified as an amount, or the time to live if the time to live is specified as an expiration time) being processed first. In another embodiment, the request with the nearest approaching time to live expiration is processed first, with ties or near ties being broken in favor of the request with the highest priority.

Current characteristics and environment status information are identified 242. In one embodiment current characteristics are identified by identifying the location and time of day and date. A trajectory may also be identified as part of step 242 using a previously stored location and the current location. In one embodiment, a location is identified by querying a conventional GPS receiver for the current latitude and longitude, and the trajectory is identified using a second successive query for the current latitude and longitude. Time of day may be received from the GPS receiver and converted using the location information, or the time of day may be received from a system clock.

A first mode of communication to use to attempt to provide the service being requested, either an access point, or an ad hoc network, is identified 244. If the request specifies a single mode of communication, that mode of communication is identified as the first mode of communication. Otherwise, one of the two modes of communication is identified to use as the first mode to attempt to communicate.

Some examples of requests that would specify one or both modes of communication will now be described. A request may indicate that only an access point should be used if the request is to provide data to a server and it is not desirable to provide the data to a different device in a different vehicle for transmission to the server. A request may indicate that only an ad hoc mode of communication is desired if information about very recent road conditions is desired, and any information that is that recent may not have yet been transmitted to the server, but may be held by another device that has just traversed the road for which conditions are desired.

In one embodiment, the mode selected as the first mode is whatever mode was last used, so that the overhead required to switch modes is not incurred. In one embodiment, this technique is only used if the last mode was used within a threshold amount of time of the current date and time. In another embodiment, the known access points in the segment corresponding to the current location and in the direction corresponding to the trajectory are investigated to identify whether there is a sufficient number of access points (e.g. at least one) at the current location or away from the current location but in the trajectory identified as described above, so that an attempt to identify an access point would be worthwhile. If there are no known good access points on the list of good access points in the current road segment or in the trajectory, the first mode identified is ad hoc, and otherwise, the first mode to use is communication via an access point. As noted below, the access points investigated as described above may be limited to those at or above a quality level for the location, trajectory, current or next time segment (depending on how close to the end of the current time segment the current time is) and type of day, such quality level being dependent on the amount of data specified in the request and the amount of time remaining before the expiration of the time to live.

In one embodiment, ad hoc is the preferred first mode, and so if the number of ad hoc communications detected is sufficiently high, that mode may be identified as the first mode of transmission and otherwise, the first mode of transmission is communication via an access point.

In still another embodiment, the parameters in the request are additionally used to identify the first mode of transmission. For example, if a request containing a relatively large amount of data has a long enough time to live, and several consecutive segments having a large number of access points at or above a quality level threshold are in the trajectory, and based on the speed of the automobile (which can be detected in step 242 in the manner described above), those access points will be in range before the end of the time to live, and they supply sufficient bandwidth to handle the request in the direction corresponding to the current trajectory, access point communications may be identified as the first mode of communication if the speed of the automobile is sufficiently low and the number of ad hoc connections in the segments in the trajectory is sufficiently low for types of days such as the current day and for the time segment corresponding to the current time.

An ad hoc connection may be used as the first mode of communication if the amount of data in the request is small, and there are a relatively large number of ad hoc communications detected in the road segment in the time segment for the same type of day.

In one embodiment, the trajectory used as described above is the same road in the trajectory detected in step 242. However, in another embodiment, if a user has requested driving directions and is traveling along the path provided in response to the request, the trajectory used is that specified by the driving directions.

If the first mode is an access point 246, the method continues at step 248 and otherwise 246, the method continues at step 280 of FIG. 2C.

Obtaining Historical Data.

As noted herein, historical data is used to make certain determinations: scanning frequency described above being one such determination, but others are described elsewhere herein, such as determining the first mode of communication described above. In one embodiment, historical data is data collected by the same device that is using the historical data, being referred to herein as a "subject" device. In another embodiment, the historical data is collected, for example by server 186 of FIG. 1B, from multiple devices and mathematically combined, for example, by adding the access point counters described above, or averaging the ad hoc counters described above. Such information is made available to any device, to allow other devices the benefits of the historical experience of the devices that have traveled through a given road segment. The subject device may download the data for segments for which it does not have sufficient data. Such download may be from a server 186 or devices in other automobiles 190, 192, 194 that have the required data.

In one embodiment, the device predicts the data segments for which it will require data, either its own, or that which may be supplied by other devices to the server, from which it may be downloaded after processing as described above. In another embodiment, the server predicts the segments and provides data for those segments to the device as described in more detail below.

As described in more detail below, when the subject device uses data from other devices, it may combine the data with its own data, for example if the subject device has some data, but not enough to achieve a sufficient level of confidence that the data is representative of the segment and direction corresponding to the trajectory of the automobile. In one embodiment, the server or another device provides an average of the data collected by any devices. In one embodiment, only the most recent data is used by the server, the server going backwards in time only for so long as is required to provide a sufficient level of confidence in the data for any given segment and direction.

In one embodiment, instead of averaging the information collected from other devices, the available information from a subject device is provided to the server, and then correlated with other devices that have collected statistics from some of the segments of the subject device, to allow the server to identify a subset of the devices that have the same or similar wireless characteristics as the subject device. Those devices can be correlated with still other devices, so that a subset of the devices providing statistics to server 186 and having the same or similar wireless characteristics may be identified. Only information from such correlated devices is provided by the server to be added or averaged in the manner described above, to allow information downloaded from the server 186 to be more relevant to the subject device than information would be if it were averaged across all devices, including those with different reception characteristics.

In one embodiment, the correlation begins in a stringent fashion, requiring a high degree of similarity between the subject device and the other devices. If there is an insufficient number of correlated (e.g. fewer than 10) devices are located, the correlation is relaxed until a threshold number of devices are found to be correlated to provide sufficient confidence in each of the predicted segments.

Figure 4B:
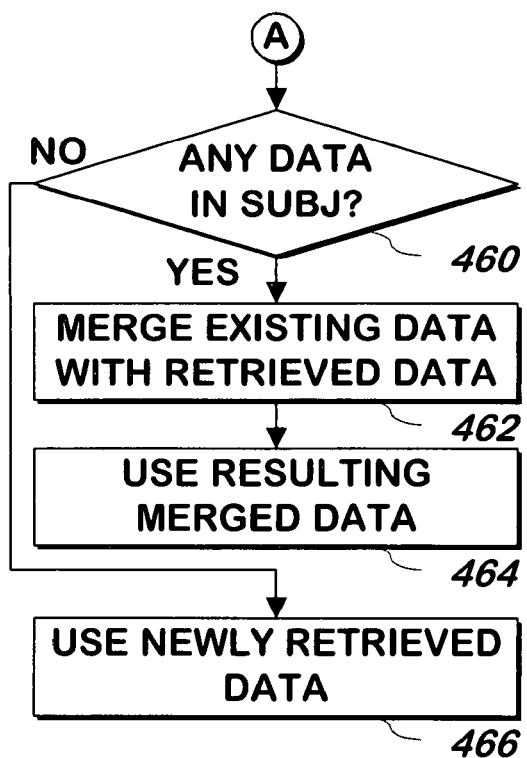
FIG. 4, consisting of FIGS. 4A and 4B, is a flowchart illustrating a method of obtaining historical data according to one embodiment of the present invention.

Referring now to FIGS. 4A and 4B, a method of obtaining historical data regarding communication facilities available for predicted road segments is shown according to one embodiment of the present invention.

Referring now to FIG. 4, consisting of FIGS. 4A and 4B, a method of obtaining historical data by a subject device from a device or other devices is shown according to one embodiment of the present invention. The subject device identifies the segments and collects data from the segments in which it travels 410. The segments may be identified by retrieving the location of the device from a conventional global positioning system, looking up the location on a conventional mapping database, and identifying the road and the segment identifier from the database. In one embodiment, data is collected in the manner described above with reference to FIG. 2B, and may include the raw data collected, the counters or change thereto, or both.

As it collects the data, the subject device provides some or all of the data, an identifier of the device, and optionally its location, and the server stores the data, and timestamps it using a date and time obtained from a system clock 412. As noted, the data provided may include the raw data, including, for example, the amount of data for an access point for each predicted segment (as well as the date and time collected, the segment identifier and trajectory information, or even the quality of service information of any access point with which it communicates (or a number designating an enumerated set of values), and in another embodiment, the data provided is the summary data described above, such as quality levels for each access point in the predicted segments and trajectory. In still another embodiment, both sets of data may be provided. As will be described in more detail below, the raw data may allow for improved correlation between devices.

A trajectory of the automobile is identified as described above 414 and the next segments are predicted using the trajectory along the currently-traveled upon road, or driving directions provided as described in more detail below, or both of these 416. In one embodiment, the trajectory is identified by identifying a series of two or more locations a short time apart (e.g. a second) using a conventional global positioning system and determining a direction of travel as the direction from the first location to the second location.

The predicted segments are identified by identifying one or more segments from a conventional map database on the road that corresponds to the last location, in the direction of the current trajectory, the one or more segments being in the direction of the current trajectory from the last location, and may encompass some or all intersecting streets for at least a short distance, so that, for example, if the automobile turns off the road being traveled, data for segments corresponding to the street turned on to will have already been retrieved.

In one embodiment, the total distance covered by the segments predicted along the same road and in the same direction of travel, as well as the type of intersecting streets that may be included in the predicted segments, depends on the type of road identified as the road being traveled upon, such identification being possible by using a conventional map database to convert the current location into a road type. For example a freeway may have predicted segments that encompass the next several miles with no intersecting streets included in the predicted segments, while a major city street may have predicted segments along that road of a mile or so, but may also include major intersecting streets nearby the one being traveled. The predicted segments while traveling on a residential street may span a relatively short distance along the road being traveled, such as a half a mile, but may also encompass all streets that intersect that residential street for a short distance, such as a block or two, allowing the predicted segments to expand from the street on which the automobile is traveling.

In one embodiment, the system and method may be used in conjunction with a conventional GPS navigation device, and in such embodiment, if the user is following driving directions previously requested and provided, the predicted segments may be more limited, for example, to the streets corresponding to the driving directions in the direction being traveled, and only a short distance away from the streets corresponding to the driving directions along major intersecting streets. Either the device or the server or both may predict the segments as described herein. The server can predict the segments using the locations provided to it.

The device or server or both determines whether or not sufficient historical data is stored in the device for the predicted segments as part of step 416. In one embodiment, sufficient historical data may be determined by the number of times a segment has been traversed in the direction being traveled within a previous period, such as one month. In such embodiment, in addition to the counters described above, segment counters or dates of travel are maintained for each direction on each segment traveled and such segment counters may be stored by the device, server or both. If sufficient historical data for the predicted segments exist 418, that historical data held by the subject device is used 420 as described herein and no additional data need be obtained as described herein. The method continues at step 410.

In one embodiment, other devices perform steps similar to steps 410 and 412 and are collecting data that the server timestamps and stores 430. Those other devices also upload the data and optionally their identifiers and locations to the server 432. In one embodiment, the steps of 430 and 432 operate as an independently running process from the remaining steps of FIGS. 4A and 4B.

If the subject device does not have sufficient historical data for the predicted segments 440 the subject device provides 434 to the server a request for data, which may include the identifiers for the predicted segments (if it performs the prediction) and may include any or all of its own identifier, location and trajectory.

In one embodiment, in response to step 434, the server provides the data for the predicted segments as shown by the dashed line in the Figure from step 434 to step 444. The data provided is not correlated as described above, but may be averaged or otherwise combined from whichever devices supplied data for that segment. In one embodiment, the server discounts the value of the oldest data compared to the newer data according to the timestamps stored when the combined data was provided. The method continues at step 460 of FIG. 4B as shown by the dashed line in the Figure.

At step 460, if the subject device contains some data for the predicted segments but not enough to provide a threshold level of confidence 460, the subject device merges, in any conventional fashion, its existing data with the data received from the server 462 and uses the resulting merged data 464. In this embodiment, the existing data of the subject device may be weighted in the merging process higher than the data retrieved from the server, because the existing data of a subject device will be more relevant for that device. The subject device may weight its own data differently according to the date and time it was received, such date and time being stored with the data collected. If there is no data for a predicted segment in the subject device 460, the newly retrieved data for that segment will be used as the data for that segment in the manner described herein 466.

As noted, the server may provide correlated data rather than uncorrelated data as described above. In this embodiment, step 436 follows step 434 in FIG. 4A.

At step 436, the server correlates the data received from the subject device with data collected from other devices to locate data from similar devices that also supplied data for the predicted segments 436. In such embodiment, the collected data may include the raw data, for example the integrated amount of data or the quality of service information that were received and the server may correlate by identifying devices that share similar raw data values for the same segments traveled for the same direction. Other factors may be used in the correlation, such as the type of day and time each of the values were retrieved. Such raw data may allow for a higher correlation to occur on the server. As noted, one device that has traveled in the same segments as the subject device may not have traveled over the predicted segments. However if that other device has traveled over the same segments as the subject device, it may be used to correlate a third device with the subject device because the three devices each have similar raw data for any common segments (in the same direction, and optionally for the same type of day and time) over which any two of them have traveled. Thus the third device may have traveled over the predicted segments in the same direction as well as some of the segments traveled by the other device in the same direction as that other device, and can be correlated to the subject device and used to provide data to the subject device because all three devices can be correlated, in spite of the fact that there is no overlap of data between the subject device and the third device.

In one embodiment, the server may use data from a minimum number of devices in order of the highest correlated devices, however if there are not enough highly correlated devices, the overall correlation factor for the data supplied may be lowered as the server attempts to provide a minimum amount of data, though the server may attempt to provide data that is as correlated as possible.

In one embodiment, not only is data for the predicted segments identified but the identifiers of any subject devices that correlated with the subject device are identified to the subject device if they are determined by the server to be near the location of the subject device. In such embodiment such devices are identified 438 and if, based on the locations of the subject device and the other device, any such other devices are nearby or are approaching the subject device 440, the server provides the device identifier of any such correlated devices, as well as a correlation factor indicating the degree of correlation between such other devices and the subject device 442 and the method continues at step 444 or step 450. If no such devices are available 440, or following the identification of such devices 442, the server may only provide the data for the predicted segments as well as the correlation factor 444. In one embodiment the data provided by a server is the raw data it receives. In another embodiment, the server provides the processed equivalent of the raw data, such as the quality level, and access point identifier of each segment and direction, describing the good access points or those having a certain quality level, as well as counters for ad hoc communications detected in that segment in the direction, and number of recent traversals of the segment in the direction. The method continues at step 450.

It is noted that information provided for a segment includes not only access point information, but also average number of ad hoc networks detected and the number of scans used for such average. Information provided for predicted segments includes sufficient information to allow the data to be merged, either accurately or in a substantially, or reasonably accurate manner.

At step 450, if an identifier of one or more devices that were correlated with the subject device were supplied by the server, an attempt is made to retrieve the data about predicted segments for the current and/or next time segments for the same type of day, either raw data or summary data, from those devices via ad hoc connections 452. In one embodiment, this attempt is made if the server is unable to complete providing such data in step 444 or in the embodiments in which step 450 follows step 442. If the process of retrieving data from identified devices is successful, 454, the method continues at step 460 of FIG. 4B. Otherwise 454, the data is retrieved from the server 456. The method continues at step 460 at step 460 of FIG. 4B.

FIG. 4B then operates as described above, except that step 462 employs the correlation factor received with that data for the device identifier to merge the data. Data highly correlated is weighted nearly the same as data obtained by the subject device. Data not quite so highly correlated is weighted less than the data obtained directly by the subject device.

Processing a Request for Service: Matching Known Access Points to the Request

As described above, information about access points is collected and analyzed, and may be supplemented from information collected by other devices in other automobiles. An attempt is made to match the information parsed from the request to these known access points at the current characteristics and environment identified in step 242 so that an access point appropriate for the request selected at step 240 can be determined 248, as described in more detail below. No access points will match a request that is specified as only being for an ad hoc network connection.

In one embodiment, any access point having a threshold quality level and corresponding to the segment and trajectory for which the access point is desired is considered to be a match. In another embodiment, access points having a quality level most closely corresponding to the request is selected. Raw data may also be used. For example, if a request specifies a high amount of data, and two access points with different bandwidths have the same quality level for the segment in the direction corresponding to the trajectory, the one having the higher amount of data will be selected. If the request had specified a lower amount of data, the access point having a lower amount of data may be selected.

In one embodiment, access point along the predicted segments may be investigated to determine which access point to select. If there are no known good access points in the predicted segments except for one such predicted segment, if the access point that can supply sufficient bandwidth to complete the request according to the amount of data specified therein, such access point is used. In still another embodiment, a high priority request or one with a short time to live expiration may be assigned an access point that has been particularly reliable, with other access points being assigned to lower priority requests or those with more distant time to live expirations.

If such a match is found 250, an attempt is made to establish contact with one of the matched access points 252. If contact is made 254, and an attempt is made to fulfill the request identified in step 240 with the access point contacted in step 248.

If the request is fulfilled 258, the method continues at step 210. If the request is not fulfilled 258, an attempt is again made to establish contact 252 with the access point matched in step 248 an additional time and the method continues as described herein.

If contact is not made 254, the method continues at step 242. Otherwise 254, an attempt is made to fulfill the remaining portion of the request with the contacted access 230. If request is fulfilled, 232, the method continues at step 210. If a matched access point is not identified 224, the method continues at step 266.

At step 260, a determination is made whether to attempt to use a different mode of transmission instead of scanning for an access point having unknown quality of service. In one embodiment, the mode of transmission may be switched if the request specified that either mode of transmission may be used and the historical data for one or more of the predicted segments being approached has had a relatively large number of ad hoc networks at the same time of day for the same day type as the current characteristics identified in step 242 and optionally reidentified at step 266; or if the time to live is expiring relatively soon, or if sufficient data for the predicted segments exists as indicated by the segment counter for the direction and at the current speed of the automobile, there will be no known good access points in any segment in which the automobile will travel before the time to live for the request expires.

If the mode should be switched 268, the method continues at step 280 of FIG. 2C and otherwise 268, the method continues at step 270.

At step 270, the scanning frequency is identified as described above and a scan is performed to identify any available access points. An attempt is made 272 to establish contact with one of the access points identified through the scan of step 270. If contact is made with such an access point 274, and attempt is made to fulfill the request with the contacted access point 276. If the request is fulfilled using the contacted access point 278, the method continues at step 210. Otherwise, the method continues at step 272.

If contact is again made 274, and attempt is made to fulfill the remainder of the request with a contacted access point 276. If contact is not made 274, the method continues at step 266.

Attempting to Locate an Ad Hoc Communication for the Request.

As noted, communication via an ad hoc mode of communication via another automobile may be made. Referring now to FIG. 2C, to locate a device available to employ the ad hoc mode of communication, the scanning frequency is identified as described above, and scanning is commenced in an attempt to locate any devices available for ad hoc communication that may be available 280. If ad hoc networks are available 282, an attempt is made to establish contact with an ad hoc network 284. In one embodiment, the attempt is made to establish contact with any ad hoc networks identified. In another embodiment, a priority system may be used to identify promising ad hoc networks and the attempt is made with the most promising of the ad hoc networks.

If contact is not made 286 with a selected ad hoc network of step 284, the method continues at step 280. If contact is made, 286, an attempt is made to fulfill the request with the contacted ad hoc network 288. If the request is fulfilled 228 and 290 the method continues at step 210 of the FIG. 2A. If the request is not fulfilled 290, the method continues at step 284.

If at step 286 contact is not made with the ad hoc network selected in step 284, the method continues at step 280. However, in one embodiment the ad hoc network having a name previously used will not be selected in subsequent iterations of step 284, or may not be selected for a period of time. If no ad hoc networks are located for which ad hoc networks able to be selected in step 284 are located 282, the information from the request is used to identify whether an access point may be used 292. If an access point may be used 294, the method continues at step 222 of FIG. 2A. Otherwise, the method continues at step 280.

System.

Figure 5:
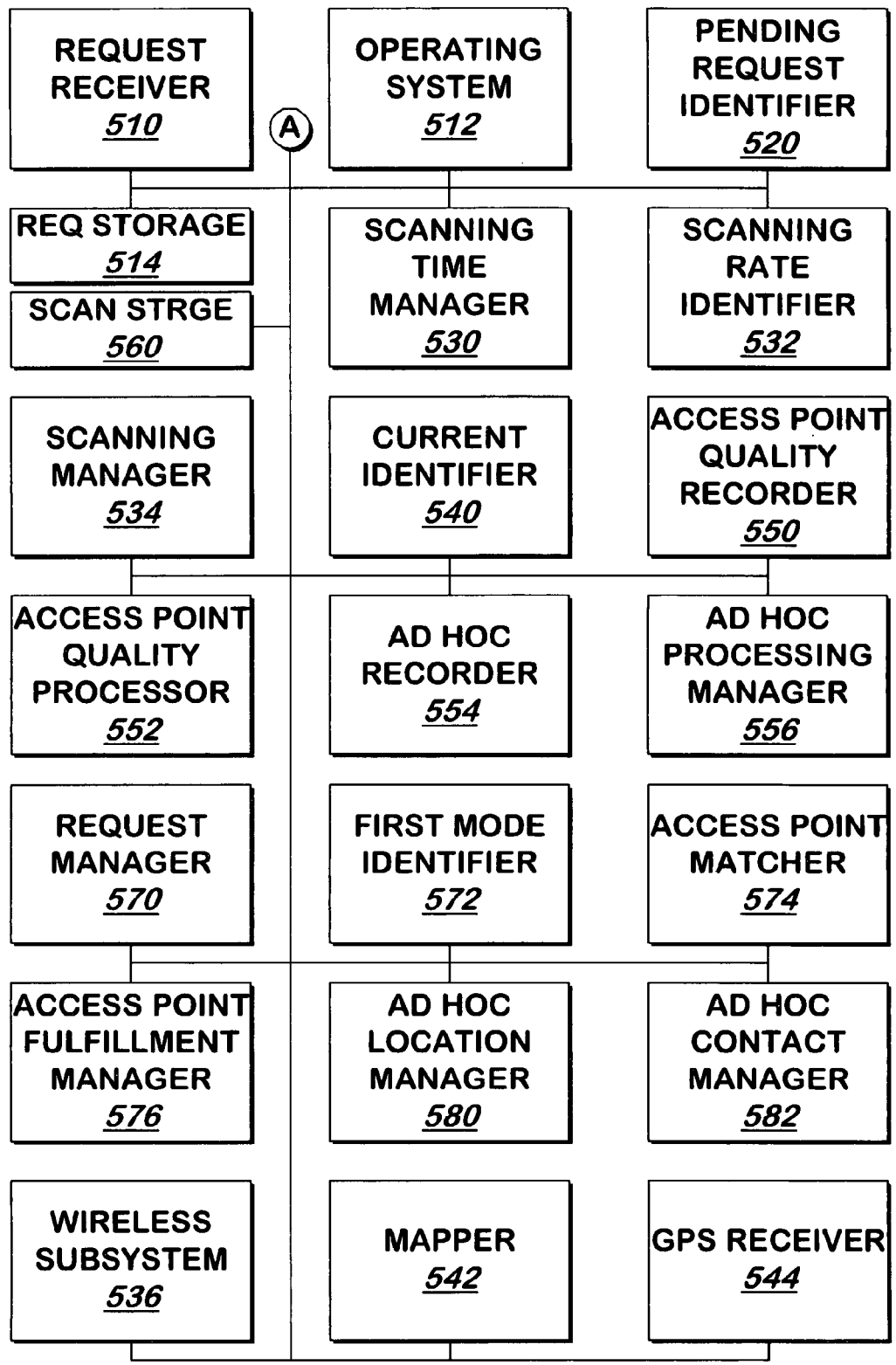
FIG. 5 is a block schematic diagram of a system for fulfilling requests for wireless service according to one embodiment of the present invention.

FIG. 5 is a block schematic diagram of a system for fulfilling requests for wireless service and identifying access points according to one embodiment of the present invention. FIG. 6 is an illustration of device 196 and server 186 shown in more detail according to one embodiment of the present invention. As indicated by the connection shown as part of FIGS. 5 and 6, FIG. 5 is also encompassed by device 196. Although for purposes of illustration one device 196 is shown, any number of devices 196 may be implemented in other embodiments, for example included in each of automobiles 190, 192, 194.

Referring now to FIGS. 5 and 6, at any time, request receiver 510 may receive requests for wireless service from applications via operating system 512, or from device data manager 620 as described below. In one embodiment, each request contains information regarding the priority of the request, a "time to live" parameter that indicates the maximum amount of time that should elapse before the data is completely transmitted, an identification of the application requesting service, and additional information described below. When request receiver 510 receives such requests, request receiver 510 stores the requests into request storage 514. In one embodiment, request storage 514 includes a set of queues where requests are placed according to the priority specified in the requests. For instance, in one embodiment there may be three queues corresponding to high priority requests, normal priority requests, and low priority requests. In one embodiment, request receiver 510 additionally orders the queues according to the expiration of the time to live parameter, and stores a date and time of such expiration in the queue with the request.

Periodically, such as once every one tenth of one second, pending request identifier 520 checks request storage 514 to determine whether any requests for service are pending. If at least one request is stored in request storage 514, pending request identifier 520 selects the request with the shortest expiration of time to live, with ties being broken by priority, and checks whether a flag has been set for that request. The flag indicates that the request is being processed. If a flag has been set, pending request identifier 520 determines whether any additional requests for service are pending, and if so, selects the request with the next shortest time to live expiration, ties being broken by priority, and checks whether a flag has been set for the newly selected request. If pending request identifier 520 finds a request for which no flag has been set, pending request identifier 520 signals request manager 570, which proceeds as described below.

Additionally, in one embodiment, pending request identifier 520 determines whether any of the requests in request storage 514 have exceeded their time to live. For each such expired request, pending request identifier 520 notifies the requesting application that the request has expired via operating system 512, and removes that request from request storage 514.

If pending request identifier 520 finds no unflagged requests in request storage 514, pending request identifier 520 signals scanning time manager 530. When so signaled, scanning time manager 530 determines whether it is time to scan. As previously described, in one embodiment scanning can occur for a half second in every one second, although in other embodiments scans may be conducted at any time. If scanning time manager 530 determines that it is not time to scan, scanning time manager 530 takes no further action until signaled again. Otherwise, if it is time to scan, scanning time manger 530 signals scanning rate identifier 532.

When so signaled, scanning rate identifier 532 obtains the current type of day, segment identifier and trajectory from current identifier 540, and retrieves from scanning storage 560 the number of times the segment has been scanned recently for the same type of day and time segment, optionally in the direction of the trajectory. Scanning rate identifier 532 uses this information to identify the scanning rate, as described above. Scanning rate identifier 532 provides scanning manager 534 with the scanning rate.

When scanning manager 534 receives the scanning rate from scanning rate identifier 532, scanning manager 534 scans for access points or ad hoc network connections via wireless subsystem 536, using the specified scanning rate. In one embodiment, wireless subsystem 536 is a conventional IEEE 802.11-compatible interface. In one embodiment, wireless subsystem 536 scans for both ad hoc and access point connections at the same time. In other embodiments wireless subsystem 536 scans for ad hoc networks separately from access points, for example by performing one or more scans of one type, and then one or more scans of another type. To scan for ad hoc networks, scanning may be performed for existing communications between devices using ad hoc networking, for devices advertising an available ad hoc network, or either of these. Scanning for access points may be performed by listening for a conventional beacon. Scanning manager 534 provides the number of ad hoc connections discovered, even if that number is zero, to ad hoc recorder 554, which proceeds as described below. Additionally, for each access point discovered, scanning manager 534 provides a name of the access point, along with quality of service information such as may be received from wireless subsystem 536 as part of the scan (e.g. RSSI, packet loss, bandwidth, and duration of contact of the access point), to access point quality recorder 550. In one embodiment, if no access points are discovered, scanning manager 534 provides an indication to access point quality recorder 550 that no access points were discovered.

When access point quality recorder 550 receives the access point name or names and corresponding quality of service information from scanning manager 534, access point quality recorder 550 signals current identifier 540. In the embodiment that access point quality recorder 550 receives an indication from scanning manager 534 that no access points were discovered, access point quality recorder 550 also signals current identifier 540.

When so signaled, current identifier 540 determines current characteristics. In one embodiment, the current characteristics include any or all of date, type of day, time, time segment, current road segment, and current trajectory. To determine the current characteristics, current identifier 540 signals GPS receiver 544. In one embodiment, GPS receiver 544 includes a conventional receiver capable of detecting and decoding GPS signals. When signaled, GPS receiver 544 determines the current date, time, and latitude and longitude coordinates using GPS data, and provides this information to current identifier 540.

Current identifier 540 also provides the latitude and longitude coordinates to mapper 542, which identifies the road segment corresponding to the coordinates received. In one embodiment, mapper 542 includes a conventional GIS database and uses conventional geocoding techniques to determine which road segment corresponds to the coordinates received. Mapper 542 provides an identifier of that road segment to current identifier 540.

In the embodiment that current characteristics include a current trajectory, current identifier 540 additionally signals trajectory identifier 622. When so signaled, trajectory identifier 622 determines the current trajectory, for example by signaling GPS receiver 544 twice in succession and comparing the two sets of latitude and longitude coordinates received from GPS receiver 544. In one embodiment, trajectory identifier 622 determines the current trajectory to be north, south, east, west, northeast, northwest, southeast, southwest or stationary, although other or additional trajectories may be used in other embodiments. In one embodiment, trajectories also include a travel speed, which trajectory identifier 622 may for example identify using the time and location information provided by GPS receiver 544, by comparing the time elapsed between signals to the distance traveled in that time.

In one embodiment, trajectories may also include driving directions, for example in the form of a route mapped to a target destination, which may have been previously provided by mapper 542 at the request of a user (not shown). To provide the driving directions, mapper 542 receives the target destination from the user, and may also receive a starting point from the user, or may request and receive the current location from current identifier 540 and use that current location as the starting point. Mapper 542 then uses conventional routing techniques to determine the "best" route between the current location and the converted destination. In one embodiment, the best route is one which is identified by the shortest or fastest path along major roads from points nearest the origin and destination supplied by the user, and the shortest or fastest path, if any, along non major roads from those points to the actual identified source and destination. Mapper 542 provides the driving directions to the user, for example via a conventional display (not shown), and also retains the most recent driving directions. In this embodiment, trajectory identifier 622 requests and receives the driving directions from mapper 542 and uses them to identify the trajectory.

When trajectory identifier 622 has identified the current trajectory, trajectory identifier 622 provides the current trajectory to current identifier 540.

When current identifier 540 has determined the current characteristics, current identifier 540 provides this information to access point quality recorder 550. Access point quality recorder 550 associates the access point name or names with the road segment identifier, and optionally with the current trajectory. Access point quality recorder 550 stores this information, along with the corresponding quality of service information for each access point and the date and time, into an access point table in scanning storage 560. In one embodiment, scanning storage 560 includes a conventional database. Additionally, in one embodiment, access point quality recorder 550 initializes a segment counter in scanning storage 560 corresponding to the current road segment, type of day and time segment, and optionally the current trajectory if such counter is not already stored in scanning storage 560, or if such a counter already exists, increments the counter. Access point quality recorder 550 also provides the access point name or names, or an indication that no access points were located, along with the road segment identifier and optionally the current trajectory, to access point quality processor 552.

When access point quality processor 552 receives the road segment identifier, optional current trajectory, and either the access point name(s) or the indication that no access points were discovered, access point quality processor 552 uses the received information and optionally any prior information stored for that road segment in the access point table in scanning storage 560 to assign one or more quality classifications. As described above, access point quality processor 552 may assign quality classifications to the road segment; to the segment and trajectory; to all access points associated with the road segment; or to all access points associated with that segment and that trajectory. Access point quality processor 552 may add the date and time to a good log associated with each access point, segment and trajectory for each access point for which information exceeds a threshold, and may add the date and time to a bad log for other access points associated with the same segment or segment and trajectory. Based on the logs, access point quality processor 552 may identify an access point as good or bad, or assign one of several quality levels to each access point as described above. It is noted that quality classifications may be assigned not only to access points for which information was received, but also to access points previously associated with the segment or segment and trajectory but for which information was not received in the most recent set of information received. Such quality classifications may be adjusted to a lower quality.

When access point quality processor 552 has assigned the quality classifications to the segment and/or access points, access point quality processor 552 updates an access point quality table in scanning storage 560 with the newly assigned classification for each access point segment and trajectory, and/or updates lists, e.g. of good and bad access points, which may also be stored in scanning storage 560.

When ad hoc recorder 554 receives the number of ad hoc connections discovered from scanning manager 534 as described above, ad hoc recorder 554 signals current identifier 540, which identifies the current characteristics using GPS receiver 544 and mapper 542 as described above. Current identifier 540 provides the current characteristics to ad hoc recorder 554.

When ad hoc recorder 554 receives the current characteristics from current identifier 540, ad hoc recorder 554 logs the current time, date, road segment identifier, the number of ad hoc connections discovered, and optionally the trajectory, into an ad hoc log in scanning storage 560.

At system start up, ad hoc processing manager 556 sets a timer for a predetermined period of time, which in one embodiment corresponds to one time segment: for example, thirty minutes. When the timer expires, ad hoc processing manager 556 requests and receives the current date and time from operating system 512. In one embodiment, operating system 512 keeps the date and time internally. When ad hoc processing manager 556 receives such information, ad hoc processing manager 556 updates average ad hoc information for each road segment scanned during the most recently elapsed time segment, for example, during the last half hour. Ad hoc processing manager 556 also resets the timer for the same predetermined period, causing the average ad hoc information to be updated thereafter at the end of each time segment.

To update the average ad hoc information, ad hoc processing manager 556 determines which road segments have been scanned in the most recently elapsed time segment by checking the ad hoc log in scanning storage 560 for entries made in the period of time, e.g. thirty minutes, prior to the current time. If no road segments have been scanned in that time segment, ad hoc processing manager 556 takes no further action until the timer again expires.

Otherwise, if at least one entry has been logged in the most recently elapsed time segment, ad hoc processing manager 556 selects the first entry and finds the road segment identifier, the trajectory if one was included, and the number of ad hoc connections listed in that entry.

Ad hoc processing manager 556 also determines the current-type of day. As previously described, in one embodiment, there may be five types of days: weekdays that are not holidays, Saturdays, Sundays, holidays that fall on a weekday, and holidays that fall on a weekend, although other embodiments may use different types of days, such as may be made by appending an additional descriptor (e.g. summer and non-summer) to the above types to cause the number of types to expand by a multiple of the number of types listed above. To determine the current type of day, ad hoc processing manager 556 checks a calendar, which may for example be provided by a system administrator and stored in device data storage 614. The calendar indicates to which type of day each date corresponds. Ad hoc processing manager 556 uses the calendar and the current date received from operating system 512 to determine the current type of day.

When ad hoc processing manager 556 has determined the current type of day, ad hoc processing manager 556 uses the calendar to determine a set of dates that includes the current date as well as the most recent dates associated with the same type of day. In one embodiment, the number of dates that ad hoc processing manager 556 includes in the set varies according to the type of day. For instance, in this embodiment, if the current type of day is a holiday that falls on a weekend, ad hoc processing manager 556 may include in the set the dates of the last five days that were also weekend holidays. However, in this embodiment, if the current type of day is a non-holiday weekday, ad hoc processing manager 556 may include in the set the dates of the last twenty days that were also non-holiday weekdays.

When ad hoc processing manager 556 has found a road segment identifier and an associated number of ad hoc connections, optionally along with a trajectory, and ad hoc processing manager 556 has also determined a set of dates, then ad hoc processing manager 556 updates the average ad hoc connection information for that road segment for the corresponding time segment or segments and type or types of day. To do so, ad hoc processing manager 556 checks the ad hoc log in scanning storage 560 for any entries other than the selected entry that: a) include the same road segment identifier; b) include the same trajectory if one was found; c) include one of the dates included in the set; and d) include a time that is contained in the most recently elapsed time segment. In other words, ad hoc processing manager 556 searches for entries other than the selected entry that scanned the same road segment at the same time of day and on similar types of days, and in one embodiment in the same direction of travel. For each such entry located, ad hoc processing manager 556 finds the number of ad hoc connections listed in that entry. Ad hoc processing manager 556 then averages the total number of ad hoc connections found, or uses another function, such as taking the median or weighting an average with more recent entries receiving higher weights. Ad hoc processing manager 556 finds an entry for that road segment, type of day, time segment, and optionally for that trajectory, in an ad hoc averages table in scanning storage 560. If such an entry does not exist, ad hoc processing manager 556 creates the entry. Ad hoc processing manager 556 adds the average ad hoc connection number to the entry, overwriting any previously stored average.

Ad hoc processing manager 556 also checks the ad hoc log in scanning storage 560 to determine whether any additional road segments have been scanned in the most recently elapsed time segment. If at least one entry in the ad hoc log made during that time segment lists a road segment identifier, or optionally a road segment identifier and trajectory, for which average ad hoc connection information has not already been updated, ad hoc processing manager 556 selects that entry and proceeds as described above to average the ad hoc connection information for that road segment (or that road segment and trajectory). Ad hoc processing manager 556 continues to average the ad hoc connection information until averages have been updated for every road segment, or road segment and trajectory, scanned in the most recently elapsed time segment.

As described above, when pending request identifier 520 finds a request in request storage 514 for which no flag has been set, pending request identifier 520 signals request manager 570. When so signaled, request manager 570 selects the pending request. In the embodiment that requests are queued in request storage 514 according to priority and time to live as described above, request manager 570 selects the request with the shortest time to live, with ties being broken by selecting the request from the highest-priority queue. In other embodiments, request manager 570 may choose the request using other criteria, such as choosing the oldest pending request. Request manager 570 sets a flag on the selected request.

Request manager 570 parses the information in the selected request. In one embodiment, the request includes an identifier of the application originating the request; an indication whether the request should be fulfilled by an access point or by an ad hoc network, or whether either would be acceptable; and optional additional information, such as the name and segment identifier of any access points which previously failed to fulfill the request, and/or an indication that the request could not be fulfilled using an ad hoc connection, as described below. If the request indicates that the request should be fulfilled by an ad hoc network, request manager 570 provides the request to ad hoc location manager 580, which proceeds as described below. Otherwise, request manager 570 signals current identifier 540.

When so signaled, current identifier 540 determines the current characteristics using mapper 542 and GPS receiver 544 as described above. In one embodiment, as described above, current characteristics include any or all of date, time, road segment identifier, and trajectory. Current identifier 540 provides the current characteristics to request manager 570.

When request manager 570 receives the current characteristics, if the request indicates that the request should be fulfilled by an access point, request manager 570 provides the request along with the current characteristics to access point matcher 574, which proceeds as described below. Otherwise, if the request indicates that either an access point or an ad hoc network would be acceptable, request manager 570 provides the current characteristics, and in one embodiment the request, to first mode identifier 572.

When first mode identifier 572 receives the current characteristics and optionally the request, first mode identifier 572 determines the first mode of transmission to be used in fulfilling the request, i.e. transmission via an ad hoc connection or transmission via an access point connection. As previously described with respect to step 244, different criteria may be used to determine the first mode of transmission in different embodiments. If the request includes an indication that either an access point or an ad hoc connection failed to fulfill the request, first mode identifier 572 may determine that the other mode of transmission is the first mode to be used, or may determine that the other mode should be investigated as the default mode, as described below.

In one embodiment, whichever mode was last used to transmit requests is the first mode, so that the overhead required to switch modes is not incurred. In this embodiment, first mode identifier 572 checks an indication of which mode was last used. For example, in this embodiment, whenever request manager 570 provides a request to access point matcher 574, request manager 570 also provides an indication to first mode identifier 572 that the last mode is access point mode. Similarly, in this embodiment, whenever request manager 570 provides a request to ad hoc location manager 580, request manager 570 also provides an indication to first mode identifier 572 that the last mode is ad hoc mode. In this embodiment, whenever first mode identifier 572 receives such an indication, first mode identifier 572 internally stores the indication, overwriting any previous indication. If such an indication is stored, first mode identifier 572 may determine that the last mode is the first mode to be used, or may determine that the last mode should be investigated as the default mode, as described below.

In one embodiment, to identify the first mode if the most recently used mode is not the first mode, first mode identifier 572 starts with a default mode to use as the first mode. First mode identifier 572 then investigates whether the identified first mode of transmission will be viable in the current environment. To determine whether the first mode is viable in the current mode, if the first mode is ad hoc mode, first mode identifier 572 uses the current characteristics received from request manager 570 to find an entry corresponding to the current road segment, type of day, and time segment in the ad hoc averages table in scanning storage 560. Optionally, if trajectory is included in the current characteristics, first mode identifier 572 may determine one or more upcoming road segment, for instance by providing the current road segment and trajectory to mapper 542 and receiving the upcoming road segments back from mapper 542, and first mode identifier 572 may find entries corresponding to those road segment as well. First mode identifier 572 finds the average ad hoc connection number listed in the entry or entries and, if the number is above a predetermined threshold, for example above zero, first mode identifier 572 determines that the first mode is ad hoc mode, and otherwise, that the first mode is access point mode.

Similarly, to determine whether the first mode is viable in the current environment if the first mode is access mode, first mode identifier 572 uses the current characteristics received from request manager 570 to find any access points corresponding to the current road segment (and optionally the upcoming road segments) in the access point table in scanning storage 560. If at least one access point is known to exist in the current road segment or in upcoming road segments, first mode identifier 572 determines that the first mode is access point mode, and otherwise, that the first mode is ad hoc mode.

Additionally or alternatively, first mode identifier 572 may optionally use the quality classifications assigned by access point quality recorder 550 as described above, to ignore the existence of any access points not meeting or exceeding a predetermined threshold of good quality when it determines whether any access points correspond. Furthermore, if the request includes the name and segment identifier of any access points which previously failed to fulfill the request as described below, first mode identifier 572 in one embodiment ignores any of those access points found in the access point table for the purpose of selecting the first mode. In this embodiment, if first mode identifier 572 finds at least one access point above a threshold level of quality, or in another embodiment finds more than a threshold number of such access points, first mode identifier 572 determines that the first mode is access point mode, and otherwise determines that the first mode is ad hoc mode.

In another embodiment, first mode identifier 572 investigates both ad hoc mode and access point mode as described above, and determines that if more average ad hoc connections than access points exceeding a threshold level of quality are recorded for the road segment or segments in scanning storage 560, then the first mode is ad hoc mode, and otherwise, the first mode is access point mode.

In one embodiment, if the number of average ad hoc connections and the number of access points exceeding a threshold level of quality are both below a predetermined threshold number, e.g. 1, or if such numbers in the current road segment are below the threshold number but numbers for upcoming road segments are higher, and optionally if the request's time to live exceeds a threshold amount of time such as one second, first mode identifier 572 may add a "delay" indication to the request that includes an expiration time, for example, one tenth of a second from the current time. In the embodiment that the current characteristics include a driving speed, first mode identifier 572 may vary the expiration time of the delay indication inversely with the driving speed, so that the delay is shorter if the speed is greater, for example, as would be used to allow first mode identifier 572 to identify the delay as the estimated time of arrival to the next segment, with a mode having the requisite number of average ad hoc connections or access points with a threshold quality level. First mode identifier 572 then removes the flag from that request in request storage 514, allowing the request to again be selected from the queue and processed as described above. In this embodiment, when request manager 570 selects pending requests as described above, request manager 570 skips requests carrying the "delay" indication until the expiration time has passed.

Otherwise, if a first mode is identified, first mode identifier 572 provides request manager 570 with an indication of which mode is the first mode. When request manager 570 receives the indication, if the first mode is ad hoc mode, request manager 570 provides the request to ad hoc location manager 580, which proceeds as described below. Otherwise, if the first mode is access point mode, request manager 570 provides the request along with the current characteristics to access point matcher 574.

When access point matcher 574 receives the request and current characteristics, access point matcher 574 attempts to match the type of request to an access point that corresponds to the current segment and optionally trajectory, and that is not part of the request (such access points being added to the request to indicate they should not be used, as described below). Access point matcher 574 uses the information in the request, the current characteristics, and the access point table in scanning storage 560 to match the request to an access point. If all of the known access points corresponding to the current road segment fail to match the request, access point matcher 574 adds the names and segment identifiers of those failed access points to the request, and removes the flag from that request in request storage 514, allowing that request to be processed again as described above.

Otherwise, if access point matcher 574 finds at least one known access point matching the request, access point matcher 574 chooses the best match as described above with respect to step 248, and provides the request along with the name and segment identifier of the matching access point to access point fulfillment manager 576.

When access point fulfillment manager 576 receives the request along with the name and segment identifier of the matching access point, access point fulfillment manager 576 attempts to establish contact with the matched access point via wireless subsystem 536, for example by sending a packet and waiting for an acknowledgement. If access point fulfillment manager 576 fails to establish contact with the matched access point, access point fulfillment manager 576 adds the name and segment identifier of the failed access point to the request, and removes the flag from that request in request storage 514, allowing that request to be processed again as described above. Otherwise, if access point fulfillment manager 576 establishes contact with the matched access point, access point fulfillment manager 576 attempts to fulfill the request using the matched access point. Access point fulfillment manager 576 may use conventional network transmission techniques such as breaking the request into packets or other sets of data and waiting for an acknowledgement from the access point before sending the next packet or other set of data.

If the connection is lost during fulfillment of the request, access point fulfillment manager 576 attempts to reconnect with the same access point, and if successful, resumes sending from the point at which it last received an acknowledgement. If the request is fulfilled, access point fulfillment manager 576 sends an acknowledgement to the application originating the request, and deletes the request from request storage 514. Otherwise, if the connection is lost during fulfillment of the request and access point fulfillment manager 576 fails to reconnect with the access point, or if for any other reason access point fulfillment manager 576 fails to fulfill the request using the access point, access point fulfillment manager 576 adds the name and segment identifier of the failed access point to the request, and removes the flag from that request in request storage 514, allowing that request to be processed again as described above.

As described above, request manager 570 may provide the request to ad hoc location manager 580. When ad hoc location manager 580 receives the request, ad hoc location manager 580 signals scanning rate identifier 532. When so signaled, scanning rate identifier 532 identifies the scanning rate as described above, and provides the scanning rate to ad hoc location manager 580. Alternatively, ad hoc location manager 580 may use the highest scanning rate or a fixed scanning rate without requesting it. When ad hoc location manager 580 receives the scanning rate, ad hoc location manager 580 commences scanning for ad hoc networks at the specified rate via wireless subsystem 536. If at least one ad hoc network is discovered, ad hoc location manager 580 provides the request, along with connection information for the ad hoc networks discovered, to ad hoc contact manager 582. Otherwise, if no ad hoc networks are discovered, ad hoc location manager 580 adds an indication to the request that it could not be fulfilled using ad hoc networks. Ad hoc location manager 580 also removes the flag from that request in request storage 514, allowing that request to be processed again as described above.

When ad hoc contact manager 582 receives the request and connection information from ad hoc location manager 580, ad hoc contact manager 582 attempts to establish contact with the ad hoc network or with one of the ad hoc networks, as described above. If ad hoc contact manager 582 fails to establish contact with the first ad hoc network, in one embodiment ad hoc contact manager 582 attempts to contact the next ad hoc network, until either a connection is made or a failed contact attempt has been made using each of the ad hoc networks. If ad hoc contact manager 582 fails to establish contact with any of the ad hoc networks, ad hoc contact manager 582 adds an indication to the request that it could not be fulfilled using an ad hoc connection, and removes the flag from that request in request storage 514, allowing that request to be processed again as described above.

Otherwise, if ad hoc contact manager 582 establishes contact with an ad hoc network, ad hoc contact manager 582 attempts to fulfill the request via the contacted network. Ad hoc contact manager 582 may use conventional network transmission techniques such as breaking the request into packets or other sets of data and waiting for an acknowledgement from the ad hoc network before sending the next packet or other set of data. If the connection is lost during fulfillment of the request, ad hoc contact manager 582 attempts to reconnect using the same ad hoc network, and if successful resumes sending from the point at which it last received an acknowledgement. Otherwise, if the connection is lost during fulfillment of the request and ad hoc contact manager 582 fails to reconnect with the ad hoc network, ad hoc contact manager 582 attempts to contact the next ad hoc network for which connection information was received from ad hoc location manager 580 as described above. When the request has been fulfilled, ad hoc contact manager 582 sends an acknowledgement to the application originating the request, and deletes the request from request storage 514. Otherwise, if ad hoc contact manager 582 fails to fulfill the request using any of the ad hoc networks, ad hoc contact manager 582 adds an indication to the request that it could not be fulfilled using an ad hoc connection. Ad hoc contact manager 582 also removes the flag from that request in request storage 514 so that it can be processed again.

At system start up, device data collector 612 sets a timer for a predetermined period of time, for example, fifteen minutes. When the timer expires, device data collector 612 requests and receives the current date and time from operating system 512. When device data collector 612 receives such information, device data collector 612 checks the access point table and the ad hoc log in scanning storage 560. As described above, the entries made by access point quality recorder 550 in the access point table include access point names associated with road segment identifiers, along with the date and time each access point was discovered by scanning manager 534, and quality of service information for each access point. Similarly, as described above, the entries made by ad hoc recorder 554 in the ad hoc log include the current time, date, road segment identifier, and number of ad hoc connections discovered by scanning manager 534. Device data collector 612 determines whether any new entries have been made in the access point table or ad hoc log in the period since a check was last performed. If so, device data collector 612 prepares a data report for server 186. Device data collector 612 also resets the timer for the same predetermined period, causing reports to be prepared periodically thereafter.

To prepare the data report, in one embodiment, device data collector 612 includes all the new entries in the access point table and the ad hoc log. In another embodiment, device data collector 612 may consolidate the raw data contained in the entries before sending it, may only send part of the data, and/or may also include data drawn from other sources in scanning storage 560, such as access point quality lists or the ad hoc averages table. For example, in one embodiment, device data collector 612 may include in the data report any or all of the identifier of each road segment scanned and the trajectory at the time of the scan; the time and date of the scan;

the average number of ad hoc connections for that road segment in that trajectory, during the time segment and type of day in which the scan was logged; names or other identifiers of all known access points corresponding to that road segment and trajectory; the raw quality data collected as described above; and the quality classification assigned to those access points. Device data collector 612 may include other types of information in the data report in other embodiments. Device data collector 612 also includes in the data report a unique device identifier, which may for example be provided by a system administrator and stored in device data storage 614.

Optionally, device data collector 612 may also include the current location, and optionally the trajectory, of the device in the data report. In the embodiment that the location is included in the data report, device data collector 612 signals GPS receiver 544, and GPS receiver 544 determines the current latitude and longitude coordinates as described above, and provides this information to device data collector 612 to be included in the data report. In the embodiment that current trajectory is included in the data report, device data collector 612 signals trajectory identifier 622, which determines and provides the current trajectory as described above.

When device data collector 612 has prepared the data report, device data collector 612 provides the data report to device data manager 620. Device data manager 620 in turn provides the data report to server 186, for example via communication interface 610. In one embodiment communication interface 610 includes a conventional network interface such as a TCP/IP-capable communication interface, which may include a conventional device such as a modem or router capable of transmitting and receiving information across a network such as the Internet, a cellular telephone network, or both.

In one embodiment, in order to minimize traffic across the cellular network, instead of using communication interface 610 to provide the data report, device data manager 620 first builds a request to send the data report via either an access point or an ad hoc connection. Device data manager 620 assigns the request a predetermined priority, such as a normal priority, and a predetermined time to live, such as one minute, and identifies the request as originating from device data manager 620. In this embodiment, device data manager 620 provides the request to request receiver 510, which stores the request in request storage 514, queued according to its priority and time to live. The request is processed as described above, until either the request is fulfilled, i.e. the data report is sent, or until pending request identifier 520 determines that the request has exceeded its time to live. In this embodiment, when pending request identifier 520 determines that the request has exceeded its time to live, pending request identifier 520 notifies device data manager 620 via operating system 512, and device data manager 620 sends the data report via communication interface 610 as described above.

The data report is received by server data manager 656 of server 186 via communication interface 650. In the preferred embodiment, any number of devices may operate independently to concurrently prepare and send data reports as described above. When server data manager 656 receives such data reports, server data manager 656 stores the data reports in server data storage 658. In one embodiment, server data storage 658 includes a conventional database. Server data manager 656 may store the information differently in different embodiments depending on the type of data (raw or processed) included in the data report. For example, in the embodiment that the data reports include raw data from ad hoc and access point scans, server data manager 656 may store the data from each scan as a record in either an access point table or an ad hoc table in server data storage 658, associated with the device identifier of the device providing the data. Alternatively or additionally, in the embodiment that the data reports include processed data such as quality metrics, server data manager 656 may maintain a set of records for each road segment and trajectory scanned by each device, where the set includes records for each time segment in each type of day, and server data manager 656 may continually update these records as new data is received.

In the embodiment that the associated information also includes a current location and optionally a trajectory for the device, server data manager 656 also stores the current location/trajectory associated with that device identifier, and optionally the current date and time, retrieved from an operating system (not shown). Server data manager 656 stores this information in a current location table in server data storage 658, overwriting, or adding to, any previous location/trajectory stored for that device identifier.

Periodically, such as every ten seconds, historical data manager 626 determines whether supplementary data about upcoming road segments should be prepared. To make the determination, historical data manager 626 first signals trajectory identifier 622. When so signaled, trajectory identifier 622 determines the current trajectory as described above. In one embodiment, as described above, trajectory identifier 622 determines the current trajectory to be north, south, east, west, or stationary. Trajectory identifier 622 provides the current trajectory to historical data manager 626.

If the current trajectory is stationary, in one embodiment, historical data manager 626 determines that no supplementary data about upcoming road segments should be requested, and historical data manager 626 takes no further action until the next determination period. Otherwise, historical data manager 626 provides the current trajectory to segment predictor 624.

When segment predictor 624 receives the current trajectory, segment predictor 624 predicts the next road segments most likely to be traversed. To do so, segment predictor 624 signals GPS receiver 544, and GPS receiver 544 determines, and provides to segment predictor 624, the current latitude and longitude coordinates as described above. Segment predictor 624 provides these coordinates along with the trajectory to mapper 542.

When mapper 542 receives the coordinates and the trajectory, mapper 542 first determines which road segment corresponds to the coordinates. As described above, in one embodiment, mapper 542 includes a conventional GIS database and uses conventional geocoding techniques to determine which road segment corresponds to the coordinates received. Mapper 542 provides to segment predictor 624 an identifier of the current road segment.

In one embodiment, segment predictor 624 also requests and receives from mapper 542 the segment identifiers corresponding to the most recent driving directions, which in one embodiment may have been previously requested by a user (not shown) and provided by mapper 542 as described above. Segment predictor 624 determines whether the current road segment corresponds to the segments of such driving directions. If the segment corresponds, segment predictor 624 requests and receives from mapper 542 the segment identifiers of major segments intersecting the driving direction segments, as described above. In one embodiment, mapper 542 also provides a predicted trajectory for each segment, based on the direction of travel in the driving directions. Segment predictor 624 determines that the direction segments and intersecting segments are predicted segments. When segment predictor 624 receives the predicted segment identifiers and optionally the predicted trajectories for each predicted segment from mapper 542, segment predictor 624 provides this information, along with the current trajectory, to historical data manager 626.

When historical data manager 626 receives the predicted segment identifiers and optionally predicted trajectories, along with the current trajectory, historical data manager 626 determines whether sufficient historical data exists for the predicted segments/trajectories. To do so, in one embodiment, historical data manager 626 checks whether counters for those segments/trajectories have been initialized by access point quality recorder 550 as described above, thus indicating that those segments/trajectories have previously been scanned. In one embodiment, historical data manager 626 also checks whether the counters indicating the number of times a segment has been scanned by that device have exceeded a predetermined threshold value, for example, 5. Recordations of dates and times a segment has been scanned by the device may be used instead of counters, and only those dates and times within a threshold amount of time from the current day and time may be counted. In other embodiments, historical data manager 626 may use other techniques to determine whether sufficient historical data exists, as described above.

If sufficient historical data exists for each predicted segment, historical data manager 626 determines that no supplementary data about upcoming road segments should be requested, and historical data manager 626 takes no further action until the next determination period.

Otherwise, historical data manager 626 provides the predicted segments/trajectories for which insufficient data exists to device request manager 628, and device request manager 628 prepares a request for supplementary data. To prepare the request for supplementary data, device request manager 628 finds the device identifier in device data storage 614, and includes the device identifier and the predicted segments/trajectories in the request for supplementary data. Device request manager 628 also retains the predicted segments/trajectories and the device identifier, discarding any previously retained information.

In one embodiment, device request manager 628 may additionally include in the request for supplementary data any or all of the current characteristics, such as date, time, current trajectory, and current road segment. In this embodiment, device request manager 628 signals current identifier 540, which determines and provides such current characteristics as described above.

When device request manager 628 has prepared the request for supplementary data, device request manager 628 provides the request for supplementary data to server 186 via communication interface 610. Server request manager 652 of server 186 receives the request for supplementary data via communication interface 650.

Although in one embodiment, historical data manager 626 and segment predictor 624 are part of device 196 as shown in FIG. 6, in another embodiment server 186 may perform these functions. In this embodiment, server 186 uses the data reports received from multiple devices as described above to keep track of the location and trajectory of each device, and also to keep a record of the road segments which each device has scanned. In this embodiment, server 186 also includes a conventional GIS database which it uses to predict the next road segments and optionally trajectories for each device. In this embodiment, rather than receiving a signal from device request manager 628, server 186 determines whether supplementary data should be provided each time a new data report is received, using the predicted road segments and the record of which road segments have been scanned by that device. If any of the predicted road segments are segments which have not already been scanned, or in one embodiment have not been scanned a sufficient number of times and/or scanned for the correct trajectory, server 186 correlates and supplies data for those road segments as described below.

Returning to the embodiment illustrated in FIGS. 5 and 6, when server request manager 652 receives the request for data from device 196, server request manager 652 parses the request and provides the device identifier and the predicted segments/trajectories to best data identifier 654.

When best data identifier 654 receives the device identifier and the predicted segments/trajectories, best data identifier 654 checks server data storage 658 for data on the predicted segments/trajectories received from devices other than the subject device. Best data identifier 654 also determines whether any of the devices providing such data are correlated to the subject device, as described above with respect to step 436. To do so, best data identifier 654 compares data provided by the devices for segments/trajectories for which data was also provided by the subject device. As described above, the data received from devices in data reports and used for the comparison may be raw data, for example including RSSI signal strengths, and/or may be processed data, for example including quality classifications. While the criteria used by best data identifier 654 to determine correlation will vary depending on the specific kinds of data used, best data identifier 654 may for example determine that a well-correlated device is one that varies from the subject device by no more than ten percent in the number of ad hoc connections discovered for a segment, and/or does not vary by more than one level in the quality assigned to access points in that segment. As further described above with respect to step 436, best data identifier 654 may infer correlation between two devices that do not share segment/trajectory data by using data from a third device which shares segment/trajectory data with both.

In one embodiment, for each predicted segment/trajectory, best data identifier 654 selects the data provided by the best-correlated device as described above, or the data most recently provided by any device, to determine access points having the highest level of quality and the average number of ad hoc connections for that segment. In another embodiment, best data identifier 654 may average or otherwise combine data provided by a number of the best correlated devices, or alternatively may select the data provided by the well-correlated device which has most frequently scanned that predicted segment/trajectory, in order to select the access points with the highest level of quality and to determine the average number of ad hoc connections for that segment. The data may be limited to data recently collected, or a function that takes into account how well correlated the device that provided the data is to the device requesting the data, and how recent that data is, with more correlated and more recent data being preferred.

Best data identifier 654 may determine the current time and day, for example by requesting and receiving the time and date from an operating system (not shown), and may select only data relevant to the current time segment and type of day, or those of the next time segment if the current time is near the end of a time segment. The data that best data identifier 654 selects may include different types of data in different embodiments. For example, in one embodiment the data may include, for each segment/trajectory: those access points having a minimum level of quality corresponding to that road segment and trajectory; the quality assigned to those access points; and the average number of ad hoc connections for that segment/trajectory, during the current time segment and current type of day. In one embodiment, best data identifier 654 may select raw data, but may process that data as described above with respect to step 444.

When best data identifier 654 has selected a set of data for each predicted segment/trajectory, in one embodiment best data identifier 654 also assigns a correlation factor to the data, which indicates the degree of correlation between the device(s) that provided the data and the subject device, as described above with respect to step 442. In one embodiment, because data on different segment/trajectories may be provided by different devices, each set of segment/trajectory data may be assigned a different correlation factor. Best data identifier 654 provides the sets of segment/trajectory data and optional associated correlation factor(s) to server request manager 652.

In one embodiment, when best data identifier 654 selects the segment/trajectory data, best data identifier 654 also determines whether any devices well-correlated to the subject device have data on all the predicted segment/trajectories. If so, best data identifier 654 assigns a correlation factor to each of those correlated devices, and provides the device identifiers to server request manager 652 along with the segment/trajectory data.

If best data identifier 654 does not find any data on some or all of the predicted segment/trajectories, best data identifier 654 provides an indication to server request manager 652 that no data was found for those segment/trajectories. In one embodiment, if no data is found for any of the predicted segment/trajectories, server request manager 652 so indicates to device 196 via communication interface 650, and device 196 takes no further action to retrieve supplementary data until the next determination period. In another embodiment, in order to minimize network traffic, server request manager 652 does not provide the indication, and instead simply takes no further action until another request for supplementary data is received.

When server request manager 652 receives the segment/trajectory data and associated correlation factor(s), server request manager 652 provides that information to device 196 via communication interface 650, and device request manager 628 of device 196 receives the information via communication interface 610. Device request manager 628 provides any segment/trajectory data received, along with the correlation factor(s) assigned to that data, to historical data manager 626, which proceeds as described below.

However, in the embodiment that server request manager 652 receives device identifiers and correlation factors from best data identifier 654 along with the segment/trajectory data, instead of providing the data to device 196, server request manager 652 first provides the correlated device identifiers along with the subject device identifier to nearby device identifier 660. When nearby device identifier 660 receives the device identifiers, nearby device identifier 660 determines whether any of the correlated devices are currently located near or are traveling towards the subject device, by checking the most recent locations and trajectories received from those devices in server data storage 658. If at least one of the correlated devices is located within an acceptable proximity to the subject device, for example within one hundred yards, nearby device identifier 660 identifies such correlated devices as being nearby to the subject device. In the embodiment that trajectory includes speed as described above, if the trajectory of any correlated devices would bring them into proximity within a short time frame, nearby device identifier 660 may also identify those devices as being nearby. Nearby device identifier 660 provides the device identifiers of any nearby correlated devices to server request manager 652, or otherwise provides to server request manager 652 an indication that none of the correlated devices are nearby.

In this embodiment, if server request manager 652 receives the indication that none of the correlated devices are nearby, server request manager 652 provides device 196 with the segment/trajectory data as described above. Otherwise, if server request manager 652 receives at least one device identifier of a nearby correlated device, in this embodiment, instead of providing the data to device 196, server request manager 652 provides device 196 with the device identifier(s) and associated correlation factor(s) of the nearby correlated device(s). Furthermore, in this embodiment, server request manager 652 also associates the segment/trajectory data with the device identifier of the subject device and retains this information for a predetermined amount of time, such as three minutes.

When device 196 receives the device identifier(s) and associated correlation factor(s) from server 186, device request manager 628 of device 196 receives the information via communication interface 610. Device request manager 628 in turn provides this information, along with the predicted segments/trajectories retained as described above, to car to car retriever 670.

When car to car retriever 670 receives one or multiple device identifiers and associated correlation factors, along with the predicted segments/trajectories, car to car retriever 670 attempts to retrieve data for those segments/trajectories from the best-correlated device, or in one embodiment any correlated device, via an ad hoc connection, using wireless subsystem 536, as described above with respect to step 452. If the connection is lost during retrieval of the segment/trajectory data, car to car retriever 670 attempts to reconnect to the same device, and if successful resumes retrieval of the segment/trajectory data. If the segment/trajectory data is retrieved, car to car retriever 670 provides the segment/trajectory data, along with the correlation factor of the device from which the segment/trajectory data was retrieved, to device request manager 628. Otherwise, if car to car retriever 670 fails to retrieve the segment/trajectory data from that device, car to car retriever 670 attempts to retrieve the segment/trajectory data from the next most well-correlated device. Car to car retriever 670 continues attempting to retrieve segment/trajectory data from devices until either the segment/trajectory data has been retrieved, or else all the nearby devices have failed to provide the segment/trajectory data, in which case car to car retriever 670 provides an indication that the segment/trajectory data could not be retrieved to device request manager 628. In one embodiment, as long as car to car retriever 670 retrieves data for at least one segment/trajectory, car to car retriever 670 provides that set of segment/trajectory data and the correlation factor to device request manager 628. In one embodiment, car to car retriever 670 may retrieve data on different segments/trajectories from different devices, and in this embodiment, car to car retriever 670 provides the correlation factor for each set of segment/trajectory data to device request manager 628.

If device request manager 628 receives the segment/trajectory data and the correlation factor(s) from car to car retriever 670, device request manager 628 provides the segment/trajectory data along with the correlation factor(s) to historical data manager 626, which proceeds as described below.

Otherwise, if device request manager 628 receives the indication that the segment/trajectory data could not be retrieved, device request manager 628 provides the indication along with the device identifier retained as described above to server request manager 652, via communication interface 610 of device 196 and communication interface 650 of server 186.

When server request manager 652 receives the indication and the device identifier, server request manager 652 provides the retained segment/trajectory data associated with that device identifier, as described above, to device request manager 628. Device request manager 628 provides the segment/trajectory data, which includes a correlation factor for each set of segment/trajectory data as described above, to historical data manager 626.

When historical data manager 626 receives the segment/trajectory data and correlation factor(s) from device request manager 628, either as sent by server 186 or as retrieved by car to car retriever 670, historical data manager 626 determines whether any existing data for the segments/trajectories described by the received data is stored in scanning storage 560. If not, historical data manager 626 stores the received segment/trajectory data in scanning storage 560. As described above, different types of segment/trajectory data may be used in different embodiments, and therefore historical data manager 626 may store the information differently in different embodiments, depending on the types of data used. For example, if the data includes raw scanning data, historical data manager 626 may add the data to the access point table and ad hoc log in scanning storage 560, and may update quality classifications and segment counters or logs as described above, using the data. The data may include the date and time it was obtained. Alternatively or additionally, if the data includes processed data, historical data manager 626 may update lists of good and bad access points or quality levels and may update the ad hoc averages table in scanning storage 560 using the processed data.

If historical data manager 626 determines that some data for the segments/trajectories described by the received data already exists in scanning storage 560, historical data manager 626 provides the received segment/trajectory data and correlation factor(s) to data merge manager 672. When data merge manager 672 receives the segment/trajectory data and correlation factor(s), data merge manager 672 merges the existing data in scanning storage 560 with the received segment/trajectory data, giving greater weight to strongly correlated data and/or more recent data, and less weight to weakly correlated or less recent data, as described above with respect to step 462. This information is used by device 196 to locate access points and ad hoc connections in order to fulfill requests for wireless service from applications, as described above.

Thus, there has been described a method and computer program product for responding to a request to access a network, the method including identifying at least one characteristic of a moving vehicle based on substantially current conditions of the vehicle, identifying a correspondence between at least one of the at least one characteristic and at least one entry in a database comprising, for various values of at least one characteristic, a plurality of types of wireless network access identified by a plurality of moving vehicles, selecting at least one of the plurality of types of wireless network access to attempt to access responsive to the entry having the correspondence identified. Optionally, the plurality of types of wireless network access includes access via wireless access points and ad hoc access. Optionally, the method and computer program product additionally includes scanning from the moving vehicle for at least one selected from the group comprising wireless access points and ad hoc access; and updating the database responsive to the scanning step. Optionally, the method and computer program product additionally includes identifying a scanning rate responsive to a number of times a current road segment has been scanned previously, and the scanning may be performed repeatedly, a substantial frequency of the scanning being responsive to the rate.

The method and computer program product include an optional feature whereby the selecting at least one of the plurality of types is additionally responsive to at least one selected from a number of ad hoc networks and a quality of service of at least one ad hoc network. The method and computer program product may apply where the at least one characteristic comprises a time characteristic and a location characteristic. The method and computer program product may apply where the time characteristic comprises type of day. The method and computer program product may apply where the location characteristic comprises a segment of a road.

There has also been described a system for responding to a request to access a network, the system including a current identifier having an input coupled to at least one sensor, the current identifier for identifying at least one characteristic based on substantially current conditions of the vehicle and providing at an output the at least one current characteristic identified, a database comprising, for various values of at least one characteristic, a plurality of entries about a plurality of types of wireless network access identified by a plurality of moving vehicles, the database having an input/output, a mode identifier having an input/output coupled to the database input/output and an input coupled to the current identifier output for receiving the at least one current characteristic identified, the mode identifier for identifying a correspondence between at least one of the at least one characteristic and at least one of the plurality of entries in the database, the mode identifier for identifying at least one of the plurality of types of wireless network access to attempt to access responsive to the entry having the correspondence identified, and for providing at an output at least one of the at least one plurality of types identified.

The system may be used where the plurality of types of wireless network access comprise access via wireless access points and ad hoc access. The system can optionally additionally include a scanning manager having an input coupled to a radio for scanning from the moving vehicle for at least one selected from the group comprising wireless access points and ad hoc access and for providing at an output information about at least one selected from a wireless access point and an ad hoc device located from the scanning, and at least one recorder/processor, each having an input coupled to the scanning manager output for receiving at least some of the information, the at least one recorder/processor for updating the database responsive to the information. The system can optionally additionally contain a scanning rate identifier having an input coupled to the database, the scanning rate identifier for identifying and providing at an output a scanning rate responsive to a number of times a current road segment has been scanned previously, as indicated by the database; and may apply where the scanning manager additionally has a scanning rate input coupled to the scanning rate identifier output for receiving the scanning rate and the scanning manager performs the scanning repeatedly, a substantial frequency of the scanning being responsive to the rate.

The system may be used where at least some of the entries in the database comprise, for various values of at least one characteristic, at least one selected from a number of ad hoc networks and a quality of service of at least one ad hoc network and the mode identifier selects the at least one of the plurality of types additionally responsive to at least one selected from a number of ad hoc networks and a quality of service of at least one ad hoc network.

The system may be used where the at least one characteristic comprises a time characteristic and a location characteristic. The system may be used where the time characteristic comprises type of day The system may be used where the location characteristic comprises a segment of a road.

What is claimed is:

1. A method of responding to a request to access a network, the method comprising:
    receiving data from an electronic device, the data based on substantially current conditions of a moving vehicle and including at least a location of the moving vehicle;
    identifying a trajectory for the moving vehicle, the trajectory based on at least the location of the moving vehicle along a currently-traveled road;
    identifying predicted road segments associated with the moving vehicle, the predicted road segments based on at least the location of the moving vehicle and the identified trajectory;
    providing a database comprising one or more wireless network access points of a network, the one or more wireless network access points comprising one or more roadside wireless network access points previously identified by a plurality of other moving vehicles;
    scanning, from the moving vehicle, for one or more ad hoc network connections to the network;
    in response to the scanning, updating the database such that the one or more wireless network access points comprise roadside wireless network access points and ad hoc network connections;
    identifying a correspondence between the predicted road segments, the identified trajectory and at least one wireless network access point in the database; and
    selecting at least one of the identified wireless network access points, based on the identified correspondence, to attempt to access the network via the selected identified wireless network access point.

2. The method of claim 1 wherein the received data further includes at least one of a type of day and time of day.

3. The method of claim 1 wherein the trajectory is based on driving directions previously provided to the electronic device.

4. The method of claim 3 wherein the trajectory is based on a series of two or more locations.

5. The method of claim 1 further comprising transmitting, to the electronic device, an access point identifier for each of the selected identified wireless network access points.

6. The method of claim 1 further comprising transmitting, to the electronic device, an access point identifier and a quality level for each of the selected identified wireless network access points.

7. The method of claim 6 wherein the selecting at least one of the identified wireless network access points is based on a quality level for the selected identified wireless network access point most closely corresponding to a quality level associated with a request to access the network.

8. The method of claim 6 wherein the selecting at least one of the identified wireless network access points is based on a quality level for the selected identified wireless network access point exceeding a predetermined quality level.

9. The method of claim 1 wherein selecting at least one of the identified wireless network access further comprises selecting at least one of the identified wireless network access points for a current road segment where the electronic device is currently located.

10. The method of claim 1 wherein selecting at least one of the identified wireless network access further comprises selecting at least one of the identified wireless network access points for an upcoming road segment where the electronic device is going to be located.

11. The method of claim 1 wherein each of the one or more ad hoc network connections to the network are via a device in one of a respective one or more other moving vehicles.

12. A computer program product comprising a non-transitory computer useable medium having computer readable program code embodied therein for responding to a request to access a network, the computer program product comprising computer readable program code devices configured to cause a computer system to:
    receive data from an electronic device, the data based on substantially current conditions of a moving vehicle and including at least a location of the moving vehicle;
    identify a trajectory for the moving vehicle, the trajectory based on at least the location of the vehicle along a currently-traveled road;
    identify predicted road segments associated with the moving vehicle, the predicted road segments based on at least the location of the moving vehicle and identified trajectory;
    access a database comprising one or more wireless network access points of a network, the one or more wireless network access points comprising one or more roadside wireless network access points previously identified by a plurality of moving vehicles;
    scan, from the moving vehicle, for one or more ad hoc network connections to the network;
    in response to the scan, update the database such that the one or more wireless network access points comprise roadside wireless network access points and ad hoc network connections;
    identify a correspondence between the predicted road segments, the identified trajectory and at least one wireless network access point in the database; and
    select at least one of the identified wireless network access points, based on the identified correspondence, to attempt to access the network via the selected identified wireless network access point.

13. The computer program product of claim 12 wherein the received data further includes at least one of a type of day and time of day.

14. The computer program product of claim 12 wherein the trajectory is based on driving directions previously provided to the electronic device.

15. The computer program product of claim 14 wherein the trajectory is based on a series of two or more locations.

16. The computer program product of claim 12 further comprising transmitting, to the electronic device, an access point identifier for each of the selected identified wireless network access points.

17. The computer program product of claim 12 further comprising transmitting, to the electronic device, an access point identifier and a quality level for each of the selected identified wireless network access points.

18. The computer program product of claim 17 wherein the selecting at least one of the identified wireless network access points is based on a quality level for the selected identified wireless network access point most closely corresponding to a quality level associated with a request to access the network.

19. The computer program product of claim 17 wherein the selecting at least one of the identified wireless network access points is based on a quality level for the selected identified wireless network access point exceeding a predetermined quality level.

20. The computer program product of claim 12 wherein selecting at least one of the identified wireless network access further comprises selecting at least one of the identified wireless network access points for a current road segment where the electronic device is currently located.

21. The computer program product of claim 12 wherein selecting at least one of the identified wireless network access further comprises selecting at least one of the identified wireless network access points for an upcoming road segment where the electronic device is going to be located.

22. The computer program product of claim 12 wherein each of the one or more ad hoc network connections to the network are via a device in one of a respective one or more other moving vehicles.

* * * * *